United States Patent
Sen et al.

(10) Patent No.: US 12,176,628 B2
(45) Date of Patent: Dec. 24, 2024

(54) SIGNALING FOR Z-ROTATION ESTIMATION

(71) Applicant: QUALCOMM Incorporated, San Diego, CA (US)

(72) Inventors: Pinar Sen, San Diego, CA (US); Seyong Park, San Diego, CA (US); Abdelrahman Mohamed Ahmed Mohamed Ibrahim, San Diego, CA (US); Renqiu Wang, San Diego, CA (US); Naga Bhushan, San Diego, CA (US); Krishna Kiran Mukkavilli, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 416 days.

(21) Appl. No.: 17/660,611

(22) Filed: Apr. 25, 2022

(65) Prior Publication Data

US 2023/0344122 A1    Oct. 26, 2023

(51) Int. Cl.
*H01Q 3/36* (2006.01)
*H04B 7/0417* (2017.01)
*H04B 17/12* (2015.01)
*H04B 17/17* (2015.01)

(52) U.S. Cl.
CPC ............ *H01Q 3/36* (2013.01); *H04B 7/0417* (2013.01); *H04B 17/12* (2015.01); *H04B 17/17* (2015.01)

(58) Field of Classification Search
None
See application file for complete search history.

(56) References Cited

U.S. PATENT DOCUMENTS

| 2011/0045768 A1* | 2/2011 | Keerthi | H01Q 21/061 455/39 |
| 2011/0199263 A1* | 8/2011 | Kang | G01S 3/04 342/442 |
| 2019/0386755 A1* | 12/2019 | Kobayashi | H04B 17/21 |
| 2021/0384642 A1* | 12/2021 | Mahanfar | H01Q 9/0414 |
| 2023/0370860 A1* | 11/2023 | Sen | H04B 7/0617 |

FOREIGN PATENT DOCUMENTS

| EP | 3979517 A1 | 4/2022 |
| WO | 2021215566 A1 | 10/2021 |
| WO | WO-2023170968 A1 * | 9/2023 |

OTHER PUBLICATIONS

International Search Report and Written Opinion—PCT/US2023/065126—ISA/EPO—Jul. 4, 2023.

* cited by examiner

*Primary Examiner* — Otis L Thompson, Jr.
(74) *Attorney, Agent, or Firm* — Arun Swain

(57) ABSTRACT

Certain aspects relate to techniques for z-axis rotation estimation for compensating signaling transmitted between two or more nodes over a wireless channel where an antenna array of at least one of the nodes is misaligned about the z-axis relative to another node. For example, a transmitting node may transmit pilot signals defined by phase shifts to provide a receiving node with a basis for estimating the angle of rotation by which the antenna arrays are misaligned. The transmitting node may then take remedial action to address the misalignment based on the estimation.

30 Claims, 13 Drawing Sheets

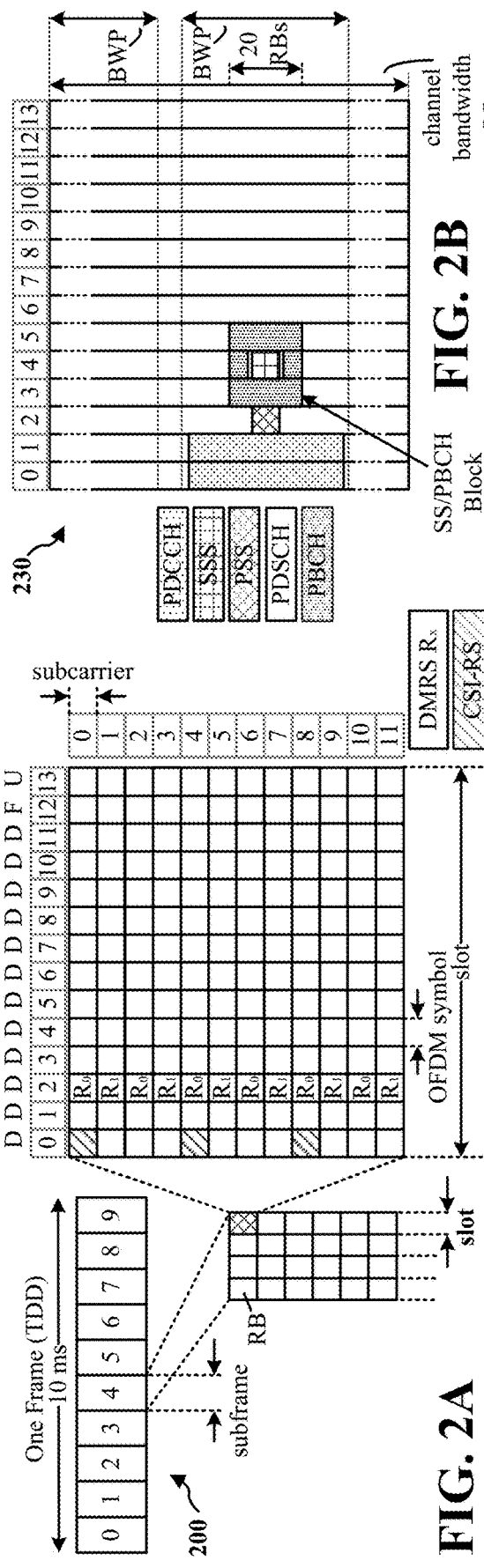
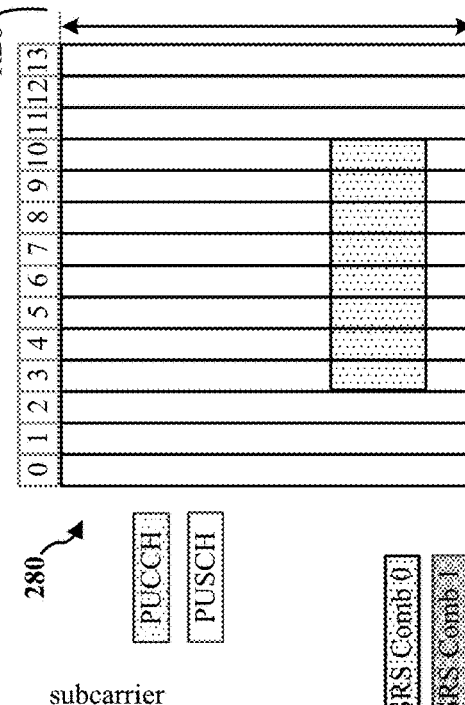
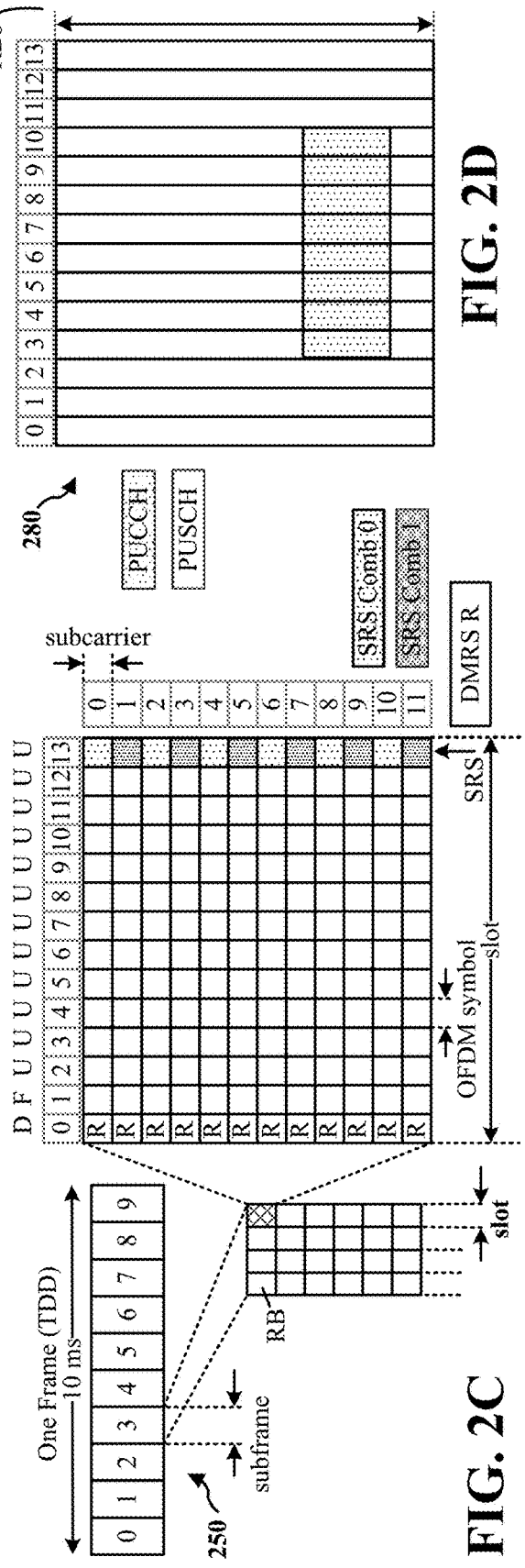
FIG. 2A
FIG. 2B
FIG. 2C
FIG. 2D

SIGNALING FOR Z-ROTATION ESTIMATION

BACKGROUND

Technical Field

The present disclosure generally relates to communication systems, and more particularly, to signaling for estimation of z-axis rotation of a wireless device.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

Some aspects of wireless communication include direct communication between devices, such as device-to-device (D2D), vehicle-to-everything (V2X), and the like. There exists a need for further improvements in such direct communication between devices. Improvements related to direct communication between devices may be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Certain aspects are directed to a method for wireless communication at an apparatus. In some examples, the method includes obtaining, from a first antenna array of a wireless node, a plurality of pilot signals, wherein the plurality of pilot signals are defined by a linear phase shift progression. In some examples, the method includes estimating a rotation of a second antenna array relative to the first antenna array based on an average phase difference between the plurality of pilot signals. In some examples, the method includes outputting, for transmission to the wireless node, the estimated rotation.

Certain aspects are directed to a method for wireless communication at an apparatus. In some examples, the method includes outputting, for transmission via a first antenna array, a plurality of pilot signals, wherein the plurality of pilot signals are defined by a linear phase shift progression. In some examples, the method includes obtaining, from a second antenna array of a wireless node, an estimated rotation of the second antenna array relative to the first antenna array based on an average phase difference between the plurality of pilot signals. In some examples, the method includes aligning the first antenna array with the second antenna array based on the estimated rotation.

Certain aspects are directed to an apparatus configured for wireless communication, comprising a memory comprising instructions and one or more processors configured to execute the instructions. In some examples, the apparatus is configured to obtain, from a first antenna array of a wireless node, a plurality of pilot signals, wherein the plurality of pilot signals are defined by a linear phase shift progression. In some examples, the apparatus is configured to estimate a rotation of a second antenna array relative to the first antenna array based on an average phase difference between the plurality of pilot signals. In some examples, the apparatus is configured to output, for transmission to the wireless node, the estimated rotation.

Certain aspects are directed to an apparatus configured for wireless communication, comprising a memory comprising instructions and one or more processors configured to execute the instructions. In some examples, the apparatus is configured to output, for transmission via a first antenna array, a plurality of pilot signals, wherein the plurality of pilot signals are defined by a linear phase shift progression. In some examples, the apparatus is configured to obtain, from a second antenna array of a wireless node, an estimated rotation of the second antenna array relative to the first antenna array based on an average phase difference between the plurality of pilot signals. In some examples, the apparatus is configured to align the first antenna array with the second antenna array based on the estimated rotation.

Certain aspects are directed to an apparatus for wireless communication. In some examples, the apparatus includes means for obtaining, from a first antenna array of a wireless node, a plurality of pilot signals, wherein the plurality of pilot signals are defined by a linear phase shift progression. In some examples, the apparatus includes means for estimating a rotation of a second antenna array relative to the first antenna array based on an average phase difference between the plurality of pilot signals. In some examples, the apparatus includes means for outputting, for transmission to the wireless node, the estimated rotation.

Certain aspects are directed to an apparatus for wireless communication. In some examples, the apparatus includes means for outputting, for transmission via a first antenna array, a plurality of pilot signals, wherein the plurality of pilot signals are defined by a linear phase shift progression. In some examples, the apparatus includes means for obtaining, from a second antenna array of a wireless node, an estimated rotation of the second antenna array relative to the first antenna array based on an average phase difference between the plurality of pilot signals. In some examples, the apparatus includes means for aligning the first antenna array with the second antenna array based on the estimated rotation.

A non-transitory computer-readable medium having instructions stored thereon that, when executed by an apparatus, cause the apparatus to perform operations comprising obtaining, from a first antenna array of a wireless node, a plurality of pilot signals, wherein the plurality of pilot signals are defined by a linear phase shift progression. In some examples, the operations include estimating a rotation of a second antenna array relative to the first antenna array based on an average phase difference between the plurality of pilot signals. In some examples, the operations include outputting, for transmission to the wireless node, the estimated rotation.

A non-transitory computer-readable medium having instructions stored thereon that, when executed by an apparatus, cause the apparatus to perform operations comprising outputting, for transmission via a first antenna array, a plurality of pilot signals, wherein the plurality of pilot signals are defined by a linear phase shift progression. In some examples, the operations include obtaining, from a second antenna array of a wireless node, an estimated rotation of the second antenna array relative to the first antenna array based on an average phase difference between the plurality of pilot signals. In some examples, the operations include aligning the first antenna array with the second antenna array based on the estimated rotation.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
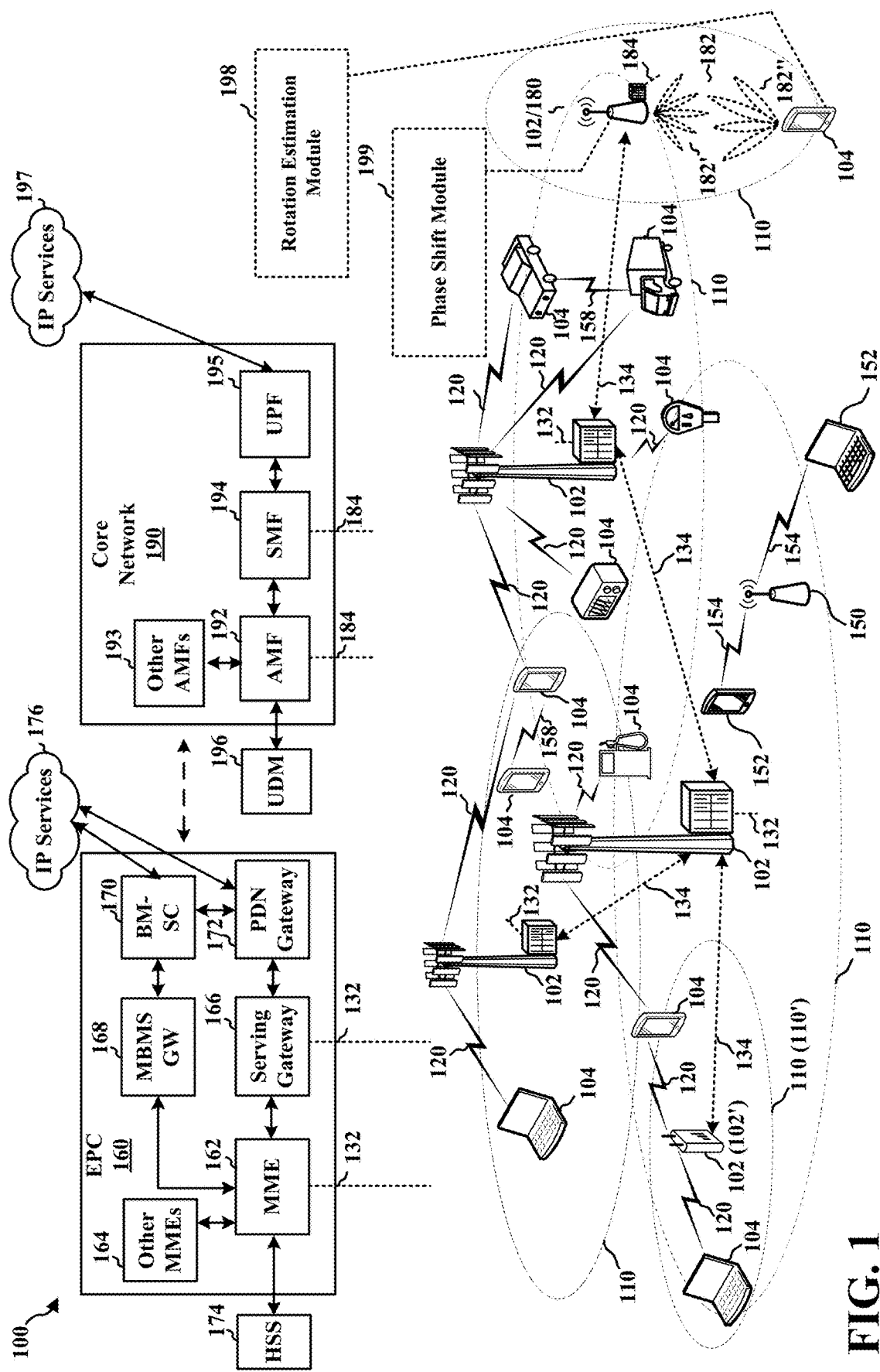
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

In certain scenarios, wireless communications (e.g., line-of-sight (LOS) communications) between two or more devices may be defined by a high multiplexing gain relative to other communications (e.g., beyond LOS (BLOS) or massive multiple-input multiple output (MIMO)). High multiplexing gain may generally result in an accurate precoder and channel knowledge at the transmitter. In some examples, a distance between a transmitting antenna array and a receiving antenna array may be a factor in determining a multiplexing gain between the two devices. For example, at shorter distances, one may expect a relatively higher multiplexing gain for wireless communications than at longer distances. However, rotation of one or more of the antenna arrays may result in a performance loss, even at shorter distances.

Accordingly, certain aspects are directed to pilot signals that are characterized by a phase shift that provide a receiver with a basis for estimating antenna rotation. Specifically, the antenna rotation being estimated may be a rotation about a z-axis (e.g., an axis perpendicular to a surface of the antenna array).

In some examples, a transmitting device may apply a phase shift to pilot signals transmitted by plurality of antenna elements in the transmitter antenna array. For example, the phase shift may be defined a $e^{-j\Delta k}$, where k is the kth antenna along an x-axis of the antenna array, and $\Delta$ is a step size of the phase shift. Of course, the transmitting device may first provide the receiving device with an indication of the phase shift, including an indication of one or more of k and $\Delta$ values. Thus, when the receiving device receives the plurality of pilot signals, the receiving device can use the phase shift as a basis for estimating any rotation of the receiver antenna array relative to the transmitter antenna array.

In one example, the receiving device may estimate the rotation by computing average phase ramps over both the x-axis and the y-axis of the received signal relative to the receiver antenna array and perform a trigonometric function (e.g., arctangent) of the average phase ramps to determine the estimated rotation about the z-axis.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Throughout the disclosure, a "network node" may be used to refer to a base station, a component of the base station, or a user equipment (UE). A base station can be implemented as an aggregated base station (e.g., FIG. 4), as a disaggregated base station (e.g., FIG. 5), an integrated access and backhaul (IAB) node, a relay node, a sidelink node, etc. Accordingly, a network node may refer to one or more of a central unit (CU), a distributed unit (DU), a radio unit (RU), a near-real time (near-RT) radio access network (RAN) intelligent controller (RIC), or a non-real time (non-RT) RIC.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR) (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, Multimedia Broadcast Multicast Service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a Packet Switch (PS) Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Further, although the present disclosure may focus on vehicle-to-everything (V2X), the concepts and various aspects described herein may be applicable to other similar areas, such as D2D communication, IoT communication, Industrial IoT (IIoT) communication, and/or other standards/protocols for communication in wireless/access networks. Additionally or alternatively, the concepts and various aspects described herein may be of particular applicability to one or more specific areas, such as vehicle-to-pedestrian (V2P) communication, pedestrian-to-vehicle (P2V) communication, vehicle-to-infrastructure (V2I) communication, and/or other frameworks/models for communication in wireless/access networks.

Referring again to FIG. 1, in certain aspects, the UE 104 and/or base station 102/180 may be configured with a rotation estimation module 198. The rotation estimation module 198 may be configured to obtain, from a second antenna array of a second apparatus, a plurality of pilot signals, wherein the plurality of pilot signals are defined by a linear phase shift progression; estimate a rotation of the first antenna array relative to the second antenna array based on an average phase difference between the plurality of pilot signals; and output, for transmission to the second apparatus, the estimated rotation.

Referring again to FIG. 1, in certain aspects, the UE 104 and/or base station 102/180 may be configured with a phase shift module 199. In some examples, the phase shift module 199 may be configured to output, for transmission via the first antenna array, a plurality of pilot signals, wherein the plurality of pilot signals are defined by a linear progression; obtain, from a second antenna array of a second apparatus, an estimated rotation of the second antenna array relative to the first antenna array based on an average phase difference between the plurality of pilot signals; and perform at least one of a mechanical compensation or a digital compensation to align the first antenna array with the second antenna array based on the estimated rotation.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency-division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kilohertz (kHz), where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where $100x$ is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgement (ACK)/non-acknowledgement (NACK) feedback. The PUSCH carries data, and may additionally be used to carry a buffer status report (BSR), a power headroom report (PHR), and/or UCI.

Figure 3:
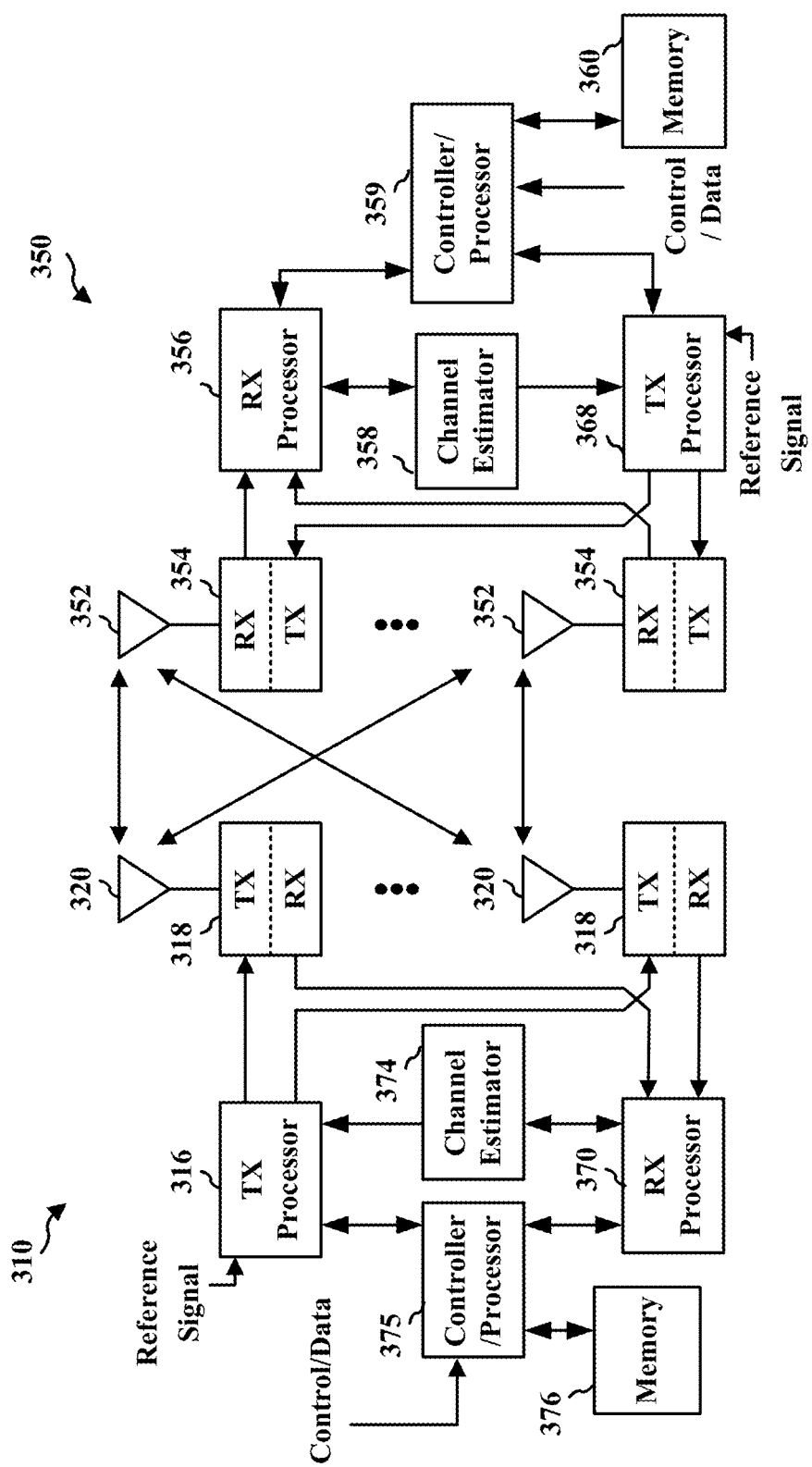
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350.

IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 198 of FIG. 1.

At least one of the TX processor 368, the RX processor 356, and the controller/processor 359 may be configured to perform aspects in connection with 199 of FIG. 1.

At least one of the TX processor 316, the RX processor 370, and the controller/processor 375 may be configured to perform aspects in connection with 199 of FIG. 1.

Figure 4:
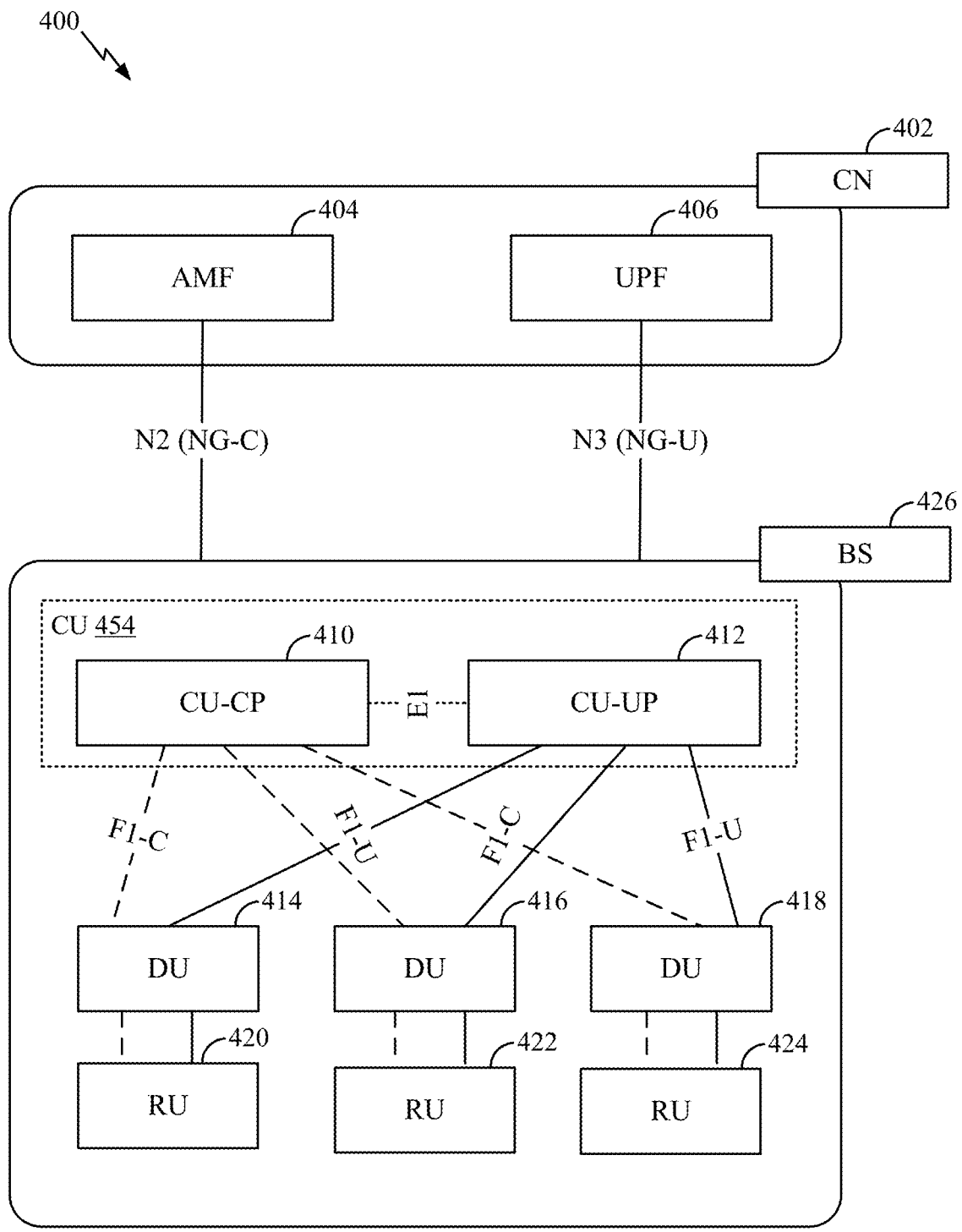
FIG. 4 is a block diagram illustrating an example monolithic (e.g., aggregated) base station and architecture of a distributed radio access network (RAN).

FIG. 4 illustrates an example monolithic (e.g., disaggregated) architecture of a distributed RAN 400, which may be implemented in the wireless communications system and an access network 100 illustrated in FIG. 1. As illustrated, the distributed RAN 400 includes core network (CN) 402 and a base station 426.

The CN 402 may host core network functions. CN 402 may be centrally deployed. CN 402 functionality may be offloaded (e.g., to advanced wireless services (AWS)), in an effort to handle peak capacity. The CN 402 may include an AMF 404 and a UPF 406. The AMF 404 and UPF 406 may perform one or more of the core network functions.

The base station 426 may communicate with the CN 402 (e.g., via a backhaul interface). The base station 426 may communicate with the AMF 404 via an N2 (e.g., NG-C) interface. The base station 426 may communicate with the UPF 406 via an N3 (e.g., NG-U) interface. The base station 426 may include a central unit-control plane (CU-CP) 410, one or more central unit-user planes (CU-UPs) 412, one or more distributed units (DUs) 414-418, and one or more radio units (RUs) 420-424.

The CU-CP 410 may be connected to one or more of the DUs 414-418. The CU-CP 410 and DUs 414-418 may be connected via a F1-C interface. As shown in FIG. 4, the CU-CP 410 may be connected to multiple DUs, but the DUs may be connected to only one CU-CP. Although FIG. 4 only illustrates one CU-UP 412, the base station 426 may include multiple CU-UPs. The CU-CP 410 selects the appropriate CU-UP(s) for requested services (e.g., for a UE). The CU-UP(s) 412 may be connected to the CU-CP 410. For example, the CU-UP(s) 412 and the CU-CP 410 may be connected via an E1 interface. The CU-UP(s) 412 may be connected to one or more of the DUs 414-418. The CU-UP(s) 412 and DUs 414-418 may be connected via a F1-U interface. As shown in FIG. 4, the CU-CP 410 may be connected to multiple CU-UPs, but the CU-UPs may be connected to only one CU-CP 410.

A DU, such as DUs 414, 416, and/or 418, may host one or more TRP(s) (transmit/receive points, which may include an edge node (EN), an edge unit (EU), a radio head (RH), a smart radio head (SRH), or the like). A DU may be located at edges of the network with radio frequency (RF) functionality. A DU may be connected to multiple CU-UPs that are connected to (e.g., under the control of) the same CU-CP (e.g., for RAN sharing, radio as a service (RaaS), and service specific deployments). DUs may be configured to individually (e.g., dynamic selection) or jointly (e.g., joint transmission) serve traffic to a UE. Each DU 414-416 may be connected with one of RUs 420/422/424.

The CU-CP 410 may be connected to multiple DU(s) that are connected to (e.g., under control of) the same CU-UP 412. Connectivity between a CU-UP 412 and a DU may be established by the CU-CP 410. For example, the connectivity between the CU-UP 412 and a DU may be established using bearer context management functions. Data forwarding between CU-UP(s) 412 may be via a Xn-U interface.

The distributed RAN 400 may support fronthauling solutions across different deployment types. For example, the RAN 400 architecture may be based on transmit network capabilities (e.g., bandwidth, latency, and/or jitter). The distributed RAN 400 may share features and/or components with LTE. For example, the base station 426 may support dual connectivity with NR and may share a common fronthaul for LTE and NR. The distributed RAN 400 may enable cooperation between and among DUs 414-418, for example, via the CU-CP 412. An inter-DU interface may not be used. Logical functions may be dynamically distributed in the distributed RAN 400.

Figure 5:
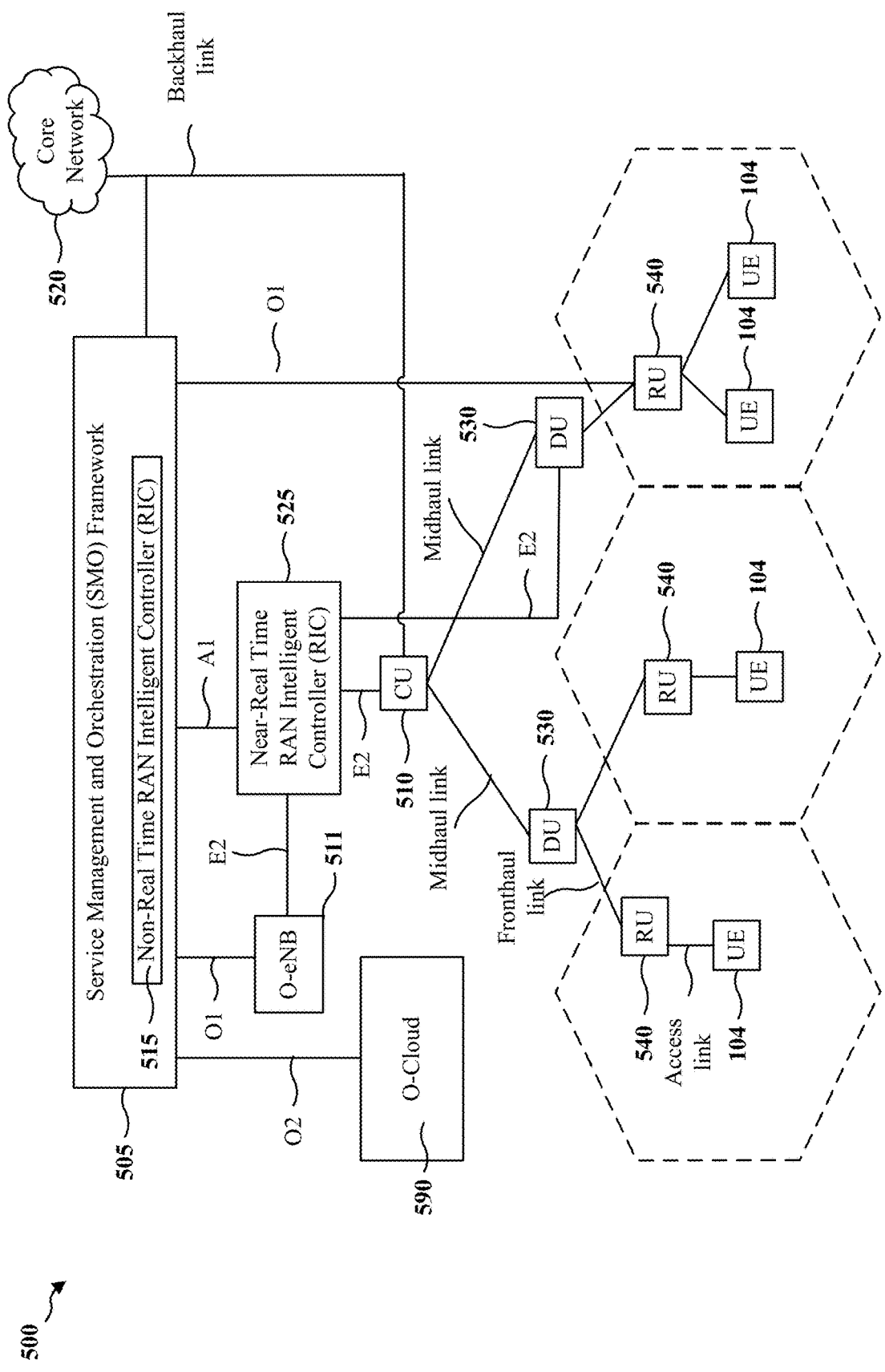
FIG. 5 is a block diagram illustrating an example disaggregated base station architecture.

FIG. 5 is a block diagram illustrating an example disaggregated base station 500 architecture. The disaggregated base station 500 architecture may include one or more CUs 510 that can communicate directly with a core network 520 via a backhaul link, or indirectly with the core network 520 through one or more disaggregated base station units (such as a near real-time (RT) RIC 525 via an E2 link, or a non-RT RIC 515 associated with a service management and orchestration (SMO) Framework 505, or both). A CU 510 may communicate with one or more DUs 530 via respective midhaul links, such as an F1 interface. The DUs 530 may communicate with one or more RUs 540 via respective fronthaul links. The RUs 540 may communicate with respective UEs 104 via one or more radio frequency (RF) access links. In some implementations, the UE 104 may be simultaneously served by multiple RUs 540.

Each of the units, i.e., the CUs 510, the DUs 530, the RUs 540, as well as the near-RT RICs 525, the non-RT RICs 515 and the SMO framework 505, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 510 may host higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 510. The CU 510 may be configured to handle user plane functionality (i.e., central unit-user plane (CU-UP)), control plane functionality (i.e., central unit-control plane (CU-CP)), or a combination thereof. In some implementations, the CU 510 can be logically split into one or more CU-UP units and one or more CU-CP units. The CU-UP unit can communicate bidirectionally with the CU-CP unit via an interface, such as the E1 interface when implemented in an O-RAN configuration. The CU 510 can be implemented to communicate with the DU 530, as necessary, for network control and signaling.

The DU 530 may correspond to a logical unit that includes one or more base station functions to control the operation of one or more RUs 540. In some aspects, the DU 530 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 530 may further host one or more low PHY layers. Each layer (or module) can be implemented with an interface configured to communicate signals with other layers (and modules) hosted by the DU 530, or with the control functions hosted by the CU 510.

Lower-layer functionality can be implemented by one or more RUs 540. In some deployments, an RU 540, controlled by a DU 530, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 540 can be implemented to handle over the air (OTA) communication with one or more UEs 104. In some implementations, real-time and non-real-time aspects of control and user plane communication with the RU(s) 540 can be controlled by the corresponding DU 530. In some scenarios, this configuration can enable the DU(s) 530 and the CU 510 to be implemented in a cloud-based RAN architecture, such as a virtual RAN (vRAN) architecture.

The SMO Framework 505 may be configured to support RAN deployment and provisioning of non-virtualized and virtualized network elements. For non-virtualized network elements, the SMO framework 505 may be configured to support the deployment of dedicated physical resources for RAN coverage requirements, which may be managed via an operations and maintenance interface (such as an O1 interface). For virtualized network elements, the SMO framework 505 may be configured to interact with a cloud computing platform (such as an open cloud (O-cloud) 590) to perform network element life cycle management (such as to instantiate virtualized network elements) via a cloud computing platform interface (such as an O2 interface). Such virtualized network elements can include, but are not limited to, CUs 510, DUs 530, RUs 540 and near-RT RICs 525. In some implementations, the SMO framework 505 can communicate with a hardware aspect of a 4G RAN, such as an open eNB (O-eNB) 511, via an O1 interface. Additionally, in some implementations, the SMO Framework 505 can communicate directly with one or more RUs 540 via an O1 interface. The SMO framework 505 also may include the non-RT RIC 515 configured to support functionality of the SMO Framework 505.

The non-RT RIC 515 may be configured to include a logical function that enables non-real-time control and optimization of RAN elements and resources, artificial intelligence/machine learning (AI/ML) workflows including model training and updates, or policy-based guidance of applications/features in the near-RT RIC 525. The non-RT RIC 515 may be coupled to or communicate with (such as via an A1 interface) the near-RT RIC 525. The near-RT RIC 525 may be configured to include a logical function that enables near-real-time control and optimization of RAN elements and resources via data collection and actions over an interface (such as via an E2 interface) connecting one or more CUs 510, one or more DUs 530, or both, as well as an O-eNB, with the near-RT RIC 525.

In some implementations, to generate AI/ML models to be deployed in the near-RT RIC 525, the non-RT RIC 515 may receive parameters or external enrichment information from external servers. Such information may be utilized by the near-RT RIC 525 and may be received at the SMO Framework 505 or the non-RT RIC 515 from non-network data sources or from network functions. In some examples, the non-RT RIC 515 or the near-RT RIC 525 may be configured to tune RAN behavior or performance. For example, the non-RT RIC 515 may monitor long-term trends and patterns for performance and employ AI/ML models to perform corrective actions through the SMO Framework 505 (such as reconfiguration via O1) or via creation of RAN management policies (such as A1 policies).

Figure 6:
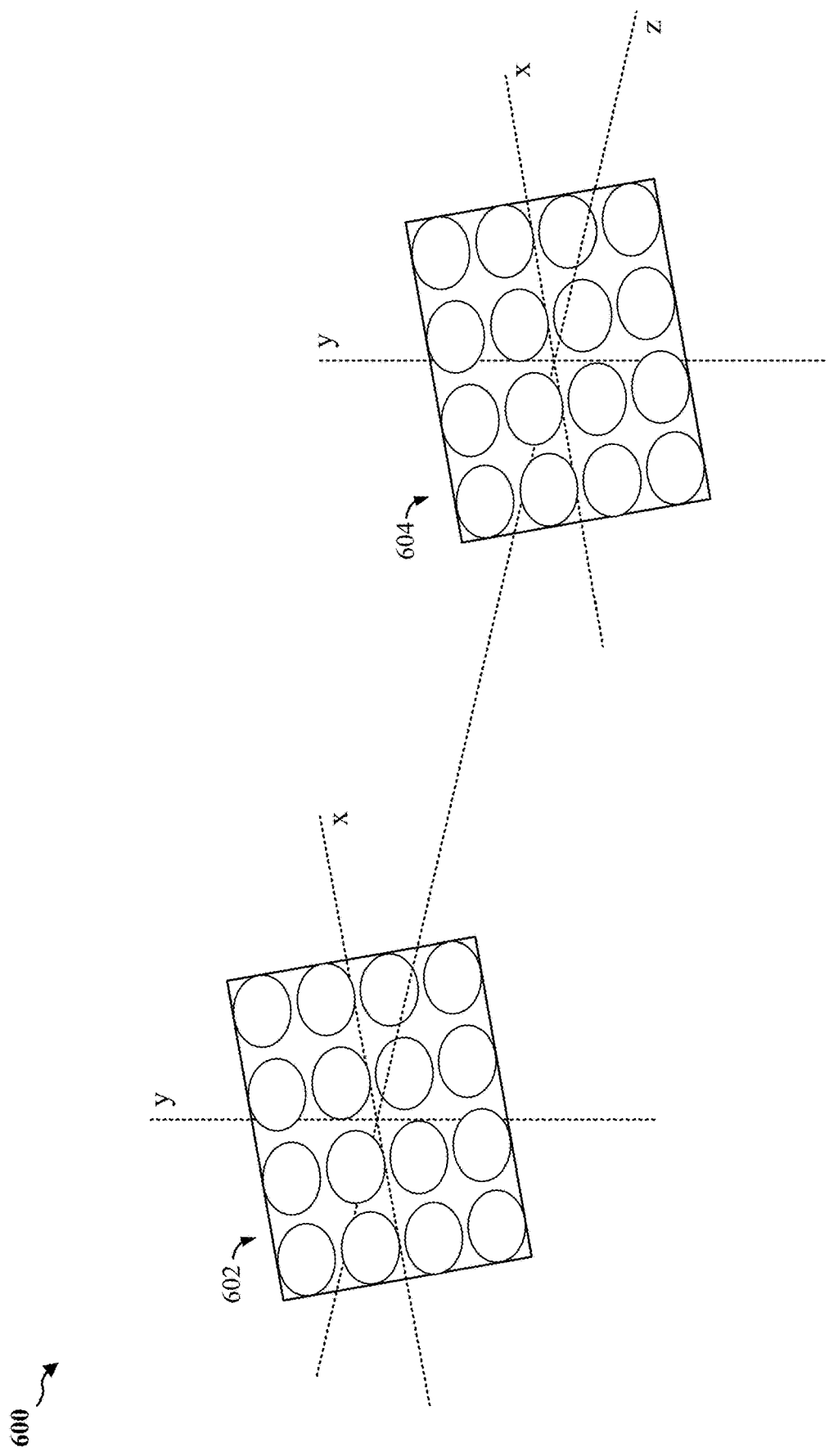
FIG. 6 is a block diagram illustrating an arrangement of example antenna arrays, including a first antenna array and a second antenna array.

FIG. 6 is a block diagram illustrating an arrangement of example antenna arrays 600, including a first antenna array 602 and a second antenna array 604. For the purposes of providing a simplified explanation, each antenna array includes 16 antenna elements. It is appreciated, however, that the number of antenna elements illustrated and recited throughout the disclosure are examples, and antenna arrays with any suitable number of antenna elements, including a different number of elements in one of the antenna arrays relative to the other antenna array, are within the scope of the present disclosure.

The first antenna array 602 may be an antenna array of a first network node (e.g., a base station, a base station component, a UE, etc.), and the second antenna array 604 may be an antenna array of a second network node. As illustrated, the first antenna array 602 and the second antenna array 604 may be aligned with each other relative to a z-axis (e.g., the z-axis that extends through the center of each of the antenna arrays and is perpendicular to a surface of each of the antenna arrays). Accordingly, the first antenna array 602 and the second antenna array 604 are parallel to each other and share the same angular rotation about the common z-axis. As illustrated, the first node and the second node may communicate directly with each other via the first antenna array 602 and the second antenna array 604 using LOS MIMO.

Example Methods for Estimating Rotation

Figure 7:
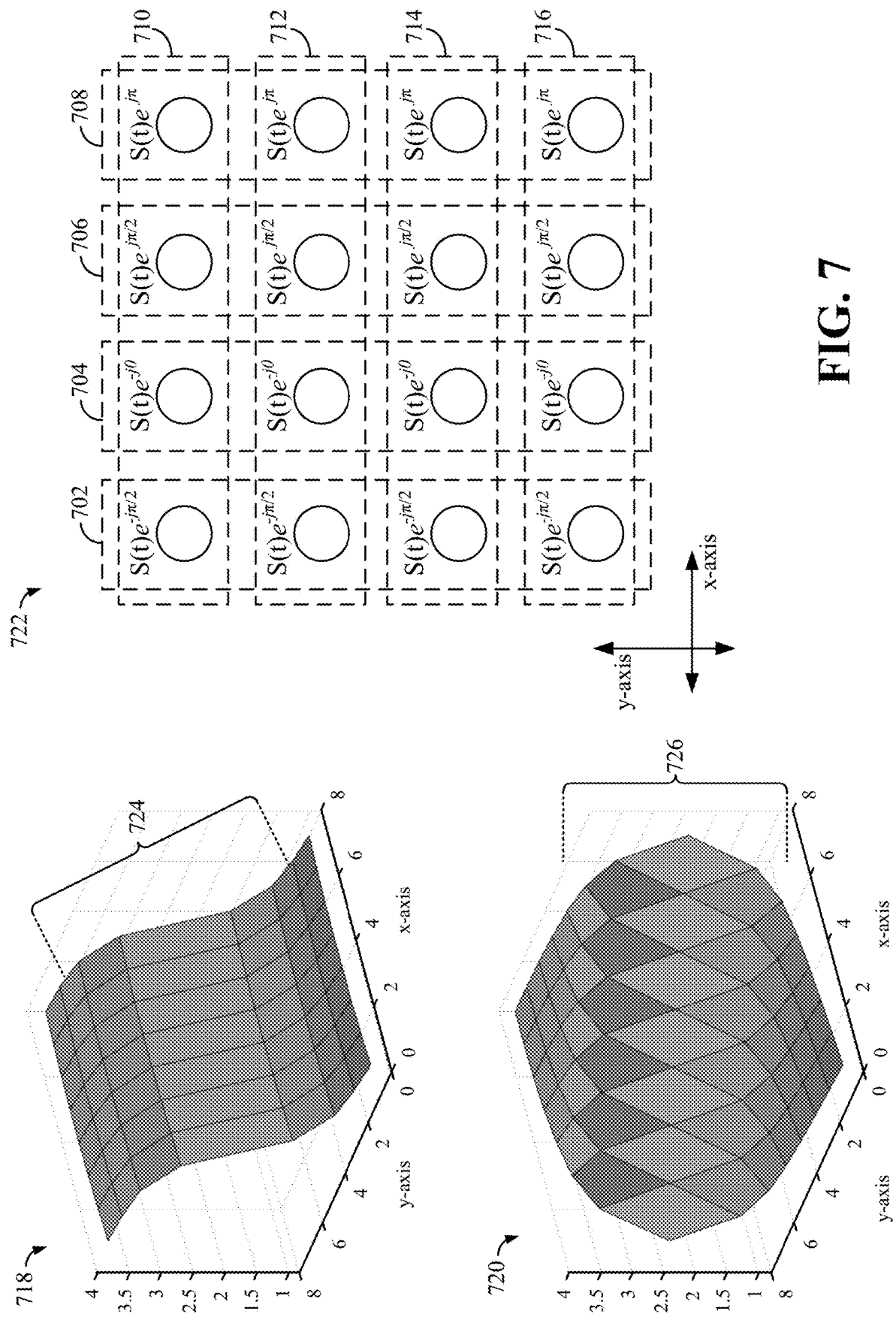
FIG. 7 illustrates a first graph depicting a received phase when there is zero rotation, a second graph depicting a received phase when there is π/4 rotation, and an example of a phase ramp applied via a phase shift to 16 antenna elements of a 4×4 transmitter antenna array.

FIG. 7 illustrates a first graph 718 depicting a received phase when there is zero rotation, a second graph 720 depicting a received phase when there is $\pi/4$ rotation, and an example of a phase ramp applied via a phase shift to 16 antenna elements of a 4×4 transmitter antenna array 722. In this example, the "rotation" is in regard to a receiver antenna array relative to the transmitter antenna array 722.

Here, the transmitter may be a first network node (e.g., a base station, a base station component, a UE, etc.) using an antenna array 722 having a plurality of antenna elements (e.g., in this example, the antenna array 722 illustrates 16 antenna elements, but it is appreciated that the antenna array 722 may include any suitable number of antenna elements for LOS MIMO wireless communications). A receiver (not shown) may be a second network node (e.g., a base station, a base station component, a UE, etc.) using an antenna array having any suitable number of antenna elements for LOS MIMO wireless communications.

The first network node may assign a phase ramp to the x-axis of the antenna array 722 by determining phase shift (e.g., $e^{-j\Delta k}$), a number of antenna elements (k) that will transmit a pilot signal with the phase shift, and a step size ($\Delta = 2\pi/N$, where N is equal to the number of transmitter antenna elements along an x-axis or x-coordinate of the transmit antenna array that will be used to transmit signaling with an applied phase shift) that may adjust the phase ramp along the x-axis. The phase ramp may be defined within an interval, for example, $(-\pi, \pi]$. That is, the first network node may determine a subset of antenna elements in the antenna array 722 (or all of the antenna elements in the antenna array) to be used to transmit the pilot signals that will have a phase shift applied to them and determine the slope of the phase ramp associated with those pilot signals. In some examples, if the first network node selects a subset of antenna elements (e.g., less than all of the antenna elements in the antenna array 722), then the first network node may select a group of antenna elements that are symmetric in size, and where each antenna element is adjacent to another antenna element (e.g., where each selected antenna element in the group is adjacent to at least three other antenna elements, and where the grouping is of consecutive antenna elements). As illustrated, the first network node may apply a phase shift a pilot signal transmitted from each of the antenna elements in the antenna array 722.

In some examples, the first network node may select the step size based at least in part on an amount of ambient noise (e.g., other signals in a surrounding air interface) detected by the first network node. For example, the first network node may select a larger step size (e.g., $\pi$) if the noise level is above a certain threshold, or a smaller step size (e.g., $\pi/4$) if the noise level is below the threshold. In another example, the first network node may select the step size based at least in part on the size of the transmitter antenna array 722 (e.g., a number of antenna elements in the group). For example, the first network node may select a larger step size (e.g., $\pi$) if the number of antenna elements used to transmit the phase shifted pilot signals is greater a threshold number, or a smaller step size (e.g., $\pi/4$) if the number of antenna elements used to transmit the phase shifted pilot signals is less than the threshold number. In another example, the first network node may select the step size based at least in part on the size of the receiver antenna array. In this example, the first network node may select a larger step size (e.g., $\pi$) if the number of antenna elements in the receiver antenna array is greater a threshold number, or a smaller step size (e.g., $\pi/4$) if the number of antenna elements in the receiver antenna array is less than the threshold number.

In some examples, the first network node may transmit an indication of the phase shifted signal (e.g., one or more of the step size and/or the antenna elements in the antenna array 722) to the second network node so that both the first network node and the second network node have the same phase shifted information. The indication may be transmitted via radio resource control (RRC) messaging.

As illustrated, the first graph 718 depicts a phase ramp 724 of phase-shifted pilot signals as received by the second network node from the first network node when there is zero rotation about the z-axis (z-axis of FIG. 6). That is, the transmitter antenna array 722 is aligned in terms of the z-axis with the receiver antenna array. It should be noted that when there is no rotation, the y-axis values are constants. The second graph 720 depicts a phase ramp 726 of phase-shifted pilot signals as received by the second network node from the first network node when there is a $\pi/4$ rotation about the z-axis. As such, the transmitter antenna array 722 is not aligned in terms of the z-axis with the receiver antenna array. It should be noted that the first graph 718 and the second graph 720 are from the perspective of the second network node.

The first network node may transmit a pilot signal (e.g., $S(t)e^{-j\Delta k}$) via each of the antenna elements of the transmitter antenna array 722, wherein the phase shift (e.g., $e^{-j\Delta k}$) is applied to each pilot signal. In some examples, the pilot signals are transmitted simultaneously. As shown in FIG. 7, all antenna elements with the same x-axis position share the same phase shift using $\Delta=\pi/2$. For example, a first group 702 of antenna elements transmit a pilot signal with the following phase shift: $e^{-j\pi/2}$. A second group 704 of antenna elements transmit a pilot signal with the following phase shift: $e^{-j0}$. A third group 706 of antenna elements transmit a pilot signal with the following phase shift: $e^{j\pi/2}$. And a fourth group 708 of antenna elements transmit a pilot signal with the following phase shift: $e^{j\pi}$. Thus, the step size being used is $\pi/2$, wherein the pilot signal transmitted by the antenna elements of each of the x-axis position groups 702-708 may be characterized by a linear progression of $\pi/2$ (e.g., a linear progression of a first phase shift (i.e., $e^{-j\pi/2}$), a second phase shift (i.e., $e^{-j0}$), a third phase shift (i.e., $e^{j\pi/2}$), and a fourth phase shift (i.e., $e^{j\pi}$). Thus, each antenna element of an x-axis group 702-708 may transmit signaling using the same phase shift, wherein each consecutive group increases by the step size relative to the previous group.

As shown in FIG. 7, all antenna elements with the same y-coordinate are characterized by a linear progression of a phase shift in step size increments. For example, each of a fifth group 710, a sixth group 712, a seventh group 714, and an eighth group 716 all beginning with a first antenna element configured to transmit signaling with the first phase shift; a second antenna element configured to transmit signaling with the second phase shift; a third antenna element configured to transmit signaling with the third phase shift; and a fourth antenna element configured to transmit signaling with the fourth phase shift.

Figure 8:
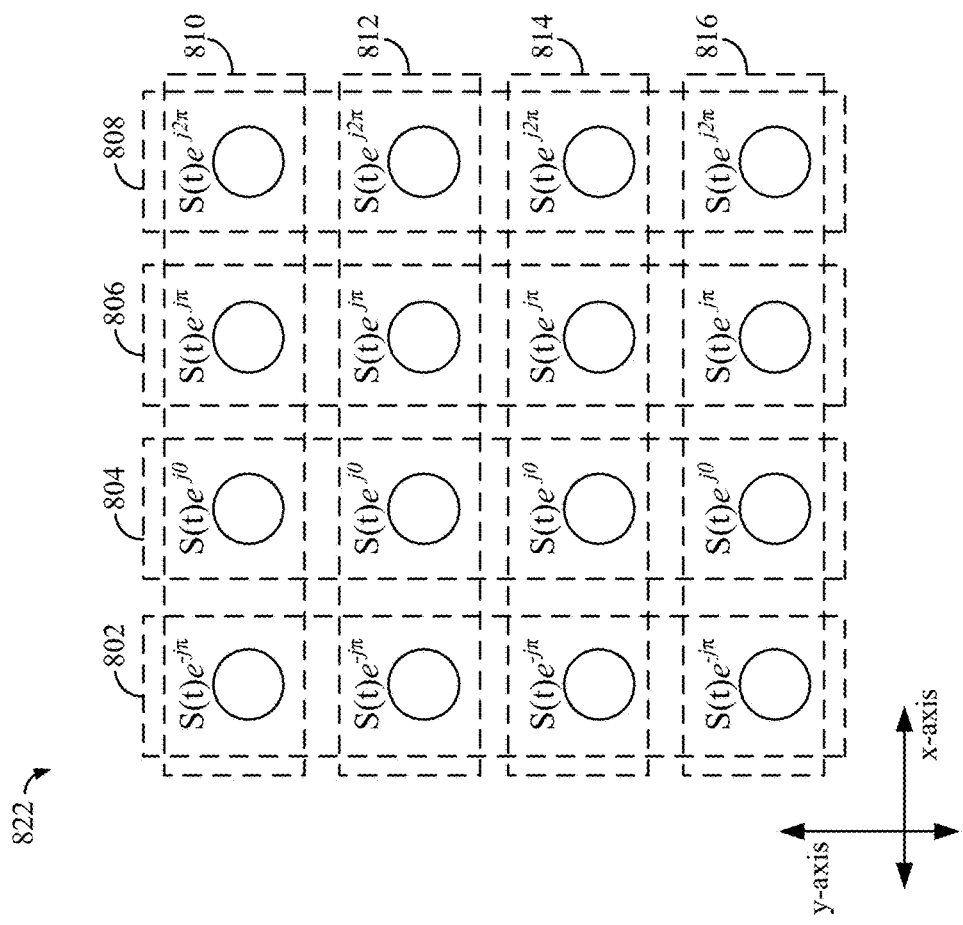
FIG. 8 illustrates a first graph depicting a received phase when there is zero rotation, a second graph depicting a received phase when there is π rotation, and an example of a phase ramp applied via a phase shift to 16 antenna elements of a 4×4 transmitter antenna array.
Figure 8:
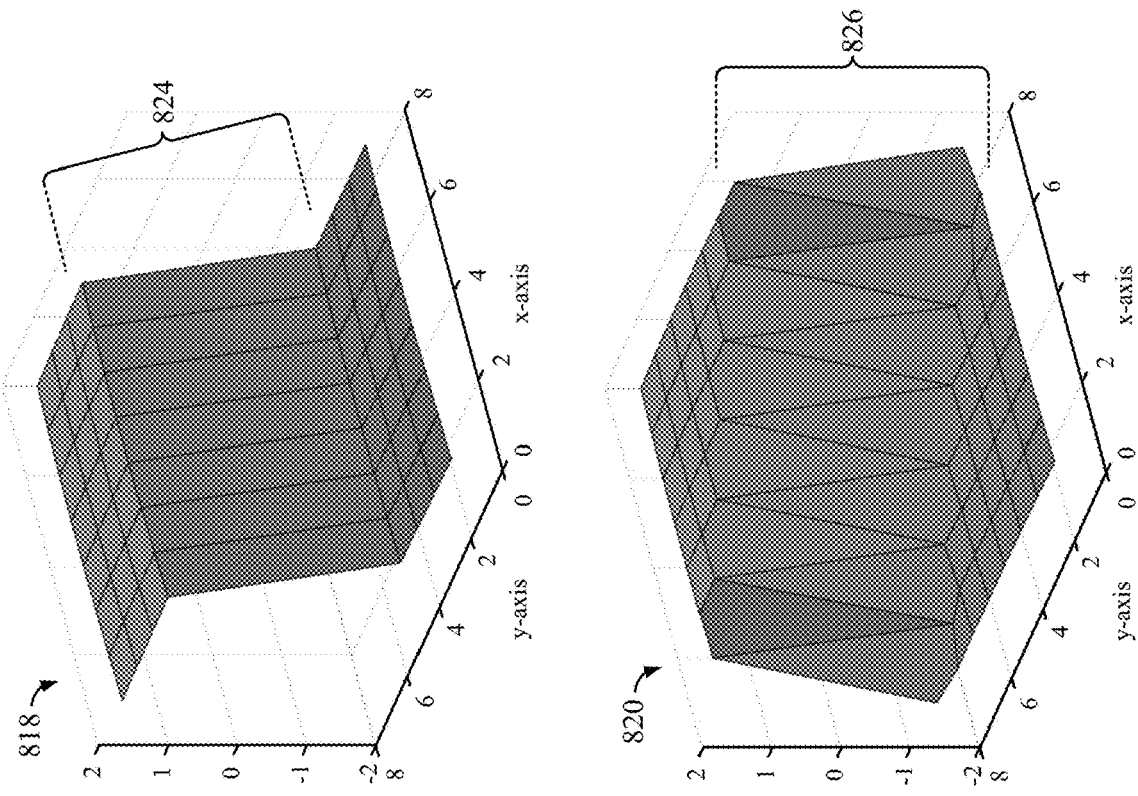

FIG. 8 illustrates a first graph 818 depicting a received phase when there is zero rotation, a second graph 820 depicting a received phase when there is π rotation, and an example of a phase ramp applied via a phase shift to 16 antenna elements of a 4×4 transmitter antenna array 822. In this example, the "rotation" is in regard to a receiver antenna array relative to the transmitter antenna array 822.

Here, the transmitter may be a first network node (e.g., a base station, a base station component, a UE, etc.) using an antenna array 822 having a plurality of antenna elements (e.g., in this example, the antenna array 822 illustrates 16 antenna elements, but it is appreciated that the antenna array 822 may include any suitable number of antenna elements for LOS MIMO wireless communications). A receiver (not shown) may be a second network node (e.g., a base station, a base station component, a UE, etc.) using an antenna array having any suitable number of antenna elements for LOS MIMO wireless communications.

The first network node may assign a phase ramp to the x-axis and select a subset or full set of antenna elements to apply the phase ramp to transmitted signaling in the same manner as discussed above in reference to FIG. 7. As illustrated, the first graph 818 depicts a phase ramp 824 of phase-shifted pilot signals as received by the second network node from the first network node when there is zero rotation about the z-axis (z-axis of FIG. 6). That is, the transmitter antenna array 822 is aligned in terms of the z-axis with the receiver antenna array. The second graph 820 depicts a phase ramp 826 of phase-shifted pilot signals as received by the second network node from the first network node when there is a π/4 rotation about the z-axis. As such, the transmitter antenna array 822 is not aligned in terms of the z-axis with the receiver antenna array. It should be noted that the first graph 818 and the second graph 820 are from the perspective of the second network node.

As shown in FIG. 8, all antenna elements with the same x-axis position share the same phase shift using $\Delta=\pi$. Accordingly, the phase ramp of the transmitted pilot signals is characterized by a steeper angle relative to the phase ramp of FIG. 7. For example, a first group 802 of antenna elements transmit a pilot signal with the following phase shift: $e^{-j\pi}$. A second group 804 of antenna elements transmit a pilot signal with the following phase shift: $e^{-j0}$. A third group 806 of antenna elements transmit a pilot signal with the following phase shift: $e^{j\pi}$. And a fourth group 808 of antenna elements transmit a pilot signal with the following phase shift: $e^{j2\pi}$. Thus, the step size being used is π, wherein the pilot signal transmitted by the antenna elements of each of the x-axis position groups 802-808 may be characterized by a linear progression of π (e.g., a linear progression of a first phase shift (i.e., $e^{-j\pi}$), a second phase shift (i.e., $e^{-j0}$), a third phase shift (i.e., $e^{j\pi}$), and a fourth phase shift (i.e., $e^{j2\pi}$). Thus, each antenna element of an x-axis group 802-808 may transmit signaling using the same phase shift, wherein each consecutive group increases by the step size relative to the previous group.

As shown in FIG. 8, all antenna elements with the same y-coordinate are characterized by a linear progression of a phase shift in step size (e.g., π) increments. For example, each of a fifth group 810, a sixth group 812, a seventh group 814, and an eighth group 816 all beginning with a first antenna element configured to transmit signaling with the first phase shift; a second antenna element configured to transmit signaling with the second phase shift; a third antenna element configured to transmit signaling with the third phase shift; and a fourth antenna element configured to transmit signaling with the fourth phase shift.

Figure 9:
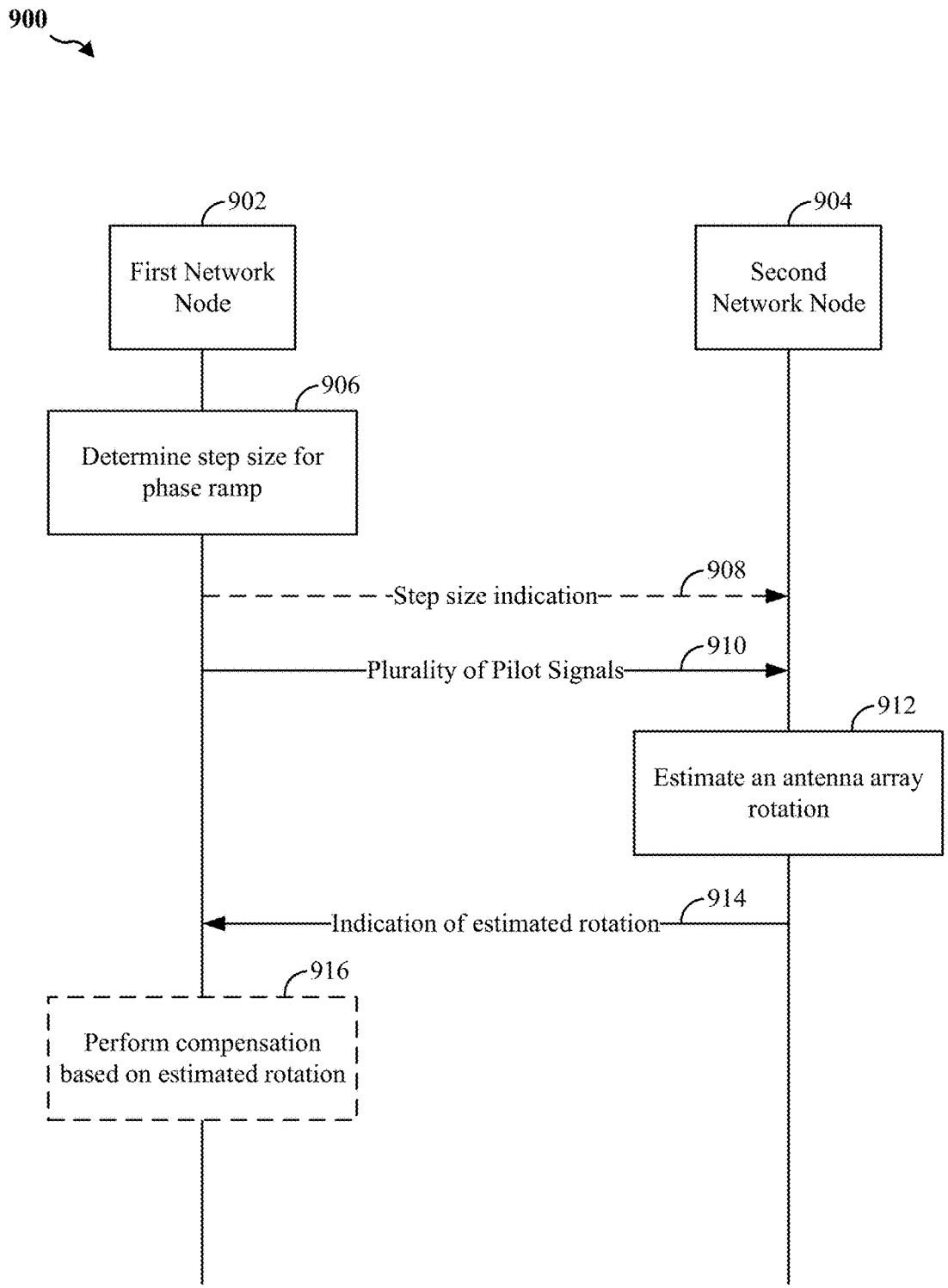
FIG. 9 is a call flow diagram illustrating example communications between two wireless apparatus.

FIG. 9 is a call-flow diagram illustrating example communications 900 between a first network node 902 and a second network node 904. The first network node 902 and the second network node 904 may be any wireless communication node capable of processing wireless signals communicated over an air interface (e.g., communication between a base station and a relay, communication between a base station and a UE, sidelink/V2X communication between two UEs, etc.). In this example, the first network node 902 is a transmitting device, configured to transmit pilot signals according to a phase ramp. The second network node 904 is a receiving device, configured to receive the pilot signals and perform rotation estimation. In certain aspects, the communications are made via a LOS MIMO wireless link between the first network node 902 and the second network node 904.

At a first process 906, the first network node 902 may determine a step size (Δ) for the phase ramp. In some examples, the step size may be defined in terms of radians. As discussed above, the step size may be determined based on one or more of ambient noise detected by the first network node, a size of the antenna array used for transmitting the pilot signals by the first network node 902, and/or a size of the antenna array used for receiving the pilot signals by the second network node 904. In some examples, the step size may be determined as a function of a number of transmit antenna elements (N) along the x-axis that will transmit pilot signals having a phase shift according to the phase ramp. For example, the step size may be determined as: $\Delta=2\pi/N$. The first network node 902 may also determine whether to transmit pilot signals using each antenna element of its antenna array, or transmit the pilot signals using only a subset of the antenna elements. In some examples, the network node may output a radio resource control (RRC) message for transmission, wherein the RRC message comprises an indication of the subset of the plurality of antenna elements. This way, the receiver (e.g., the UE) can identify the received pilot signals as being transmitted from only a portion (less than all) of the antenna elements of the network node. In some examples, the RRC message may also include an indication of whether the subset of the plurality of antenna elements are located in a center of the first antenna array or in a corner of the first antenna array. That is, the RRC message may indicate a physical location of the antenna array of the network node that includes the subset of antenna elements used to transmit pilot signals. Based on the physical location (e.g., corner, center, etc.) of the transmitting antenna elements, the UE may In a first communication 908, the first network node 902 may optionally transmit an indication of the step size to the second network node 904. Here, the transmission may be made via an RRC message. This communication may be optional if the second network node 904 is already configured with the step size according to a wireless standard and/or as a step in manufacturing of the second network node 904.

In a second communication 910, the first network node 902 may transmit a plurality of pilot signals to the second network node 904, wherein the plurality of pilot signals are defined by a linear phase shift progression. As illustrated in FIGS. 8 and 9, antenna elements that share a common x-axis position in the transmit antenna array 722/822 (e.g., first group 702/802, second group 704/804, third group 706/806, fourth group 708/808) may share a common phase shift applied to their respective pilot signals. Each successive group of antenna elements along the x-axis may increase the phase shift from the preceding group by the step size so that the transmit antenna array 722/822 transmits pilot signals defined by a linear phase shift progression along the x-axis of the antenna array.

For example, a first group 702/802 of antenna elements of the transmit antenna array may transmit pilot signals defined by a first phase shift, and a second group 704/804 of antenna elements may transmit pilot signals defined by a second phase shift, where the second phase shift is equal to the first phase shift plus the step size. A third group 706/806 of antenna elements may transmit pilot signals defined by a third phase shift, where the third phase shift is equal to the second phase shift plus the step size, and so on. Thus, a difference between the first phase shift and the second phase shift (and any subsequent consecutive phase shifts) is defined by the step size.

At a second process 912, the second network node 904 may estimate an antenna array rotation based on an average phase difference between the received pilot signals. For example, the second network node 904 may estimate a rotation of the receive antenna array of the second network node 904 relative to the transmit antenna array of the first network node 902. Here, the second network node may estimate the slope of the phase ramp (e.g., 726/826 of FIGS. 7 and 8) by determining an average phase differential of pilot signals transmitted along the x-axis of the transmitting antenna array, and an average phase differential of pilot signals transmitted along the y-axis transmitting antenna array. That is, the second network node 904 may determine a phase difference between pilot signals transmitted from adjacent elements along the x-axis and the y-axis of the transmitting antenna array.

For example, the second network node 904 may calculate a first phase difference between pilot signals transmitted in the first group 702/802 and pilot signals transmitted in the second group 704/804. The second network node 904 may then calculate a second phase difference between pilot signals transmitted in the second group 704/804 and pilot signals transmitted in the third group 706/806. The second network node 904 may then calculate a third phase difference between pilot signals transmitted in the third group 706/806 and pilot signals transmitted in the fourth group 708/808. The second network node may then calculate an average slope over the x-axis by averaging the first phase difference, the second phase difference, and the third phase difference.

Similarly, the second network node 904 may calculate a fourth phase difference between pilot signals transmitted in the fifth group 710/810 and pilot signals transmitted in the sixth group 712/812. The second network node 904 may then calculate a fifth phase difference between pilot signals transmitted in the sixth group 712/812 and pilot signals transmitted in the seventh group 714/814. The second network node 904 may then calculate a sixth phase difference between pilot signals transmitted in the seventh group 714/814 and pilot signals transmitted in the eighth group 716/816. The second network node may then calculate an average slope over the y-axis by averaging the fourth phase difference, the fifth phase difference, and the sixth phase difference.

Once the average slope over the x-axis and the average slope over the y-axis have been determined, the second network node 904 may determine the slope of the phase ramp 726/826 by computing a trigonometric function of the two average slopes. For example, the second network node 904 may estimate the slope of the phase ramp using equation 1 below:

$$\hat{\theta} = a\tan\left(\frac{\text{slope} - x}{\text{slope} - y}\right) \quad \text{Equation 1}$$

Where: $\hat{\theta}$ is the estimated slope of the phase ramp, slope-x is the average slope over the x-axis, and slope-y is the average slope over the y-axis. Accordingly, the estimated rotation may be a function of the step size, as is illustrated by the difference in the slope of the phase ramp 726 of FIG. 7 and the phase ramp 826 of FIG. 8.

At a third communication 914, the second network node 904 may then transmit, to the first network node, the estimated slope of the phase ramp (indicative of the estimated rotation).

At a third process 916, the first network node may optionally perform one or more of a mechanical compensation and/or a digital compensation to improve or resolve performance degradation caused by a z-axis misalignment of the antenna arrays of the first network node 902 and the second network node 904. In a first example, the first network node 902 may perform a mechanical compensation by mechanically rotating its antenna array about the z-axis to align the transmitting antenna array with the receiving antenna array. In a second example, the first network node may perform a digital compensation by estimating a channel matrix of a communication channel used by the first network node 902 and the second network node 904 for communication based on the estimated rotation. Based on the channel matrix, the first network node 902 may determine a singular value decomposition (SVD) in order to align a transmit beam used for wireless communication with the second network node.

Figure 10:
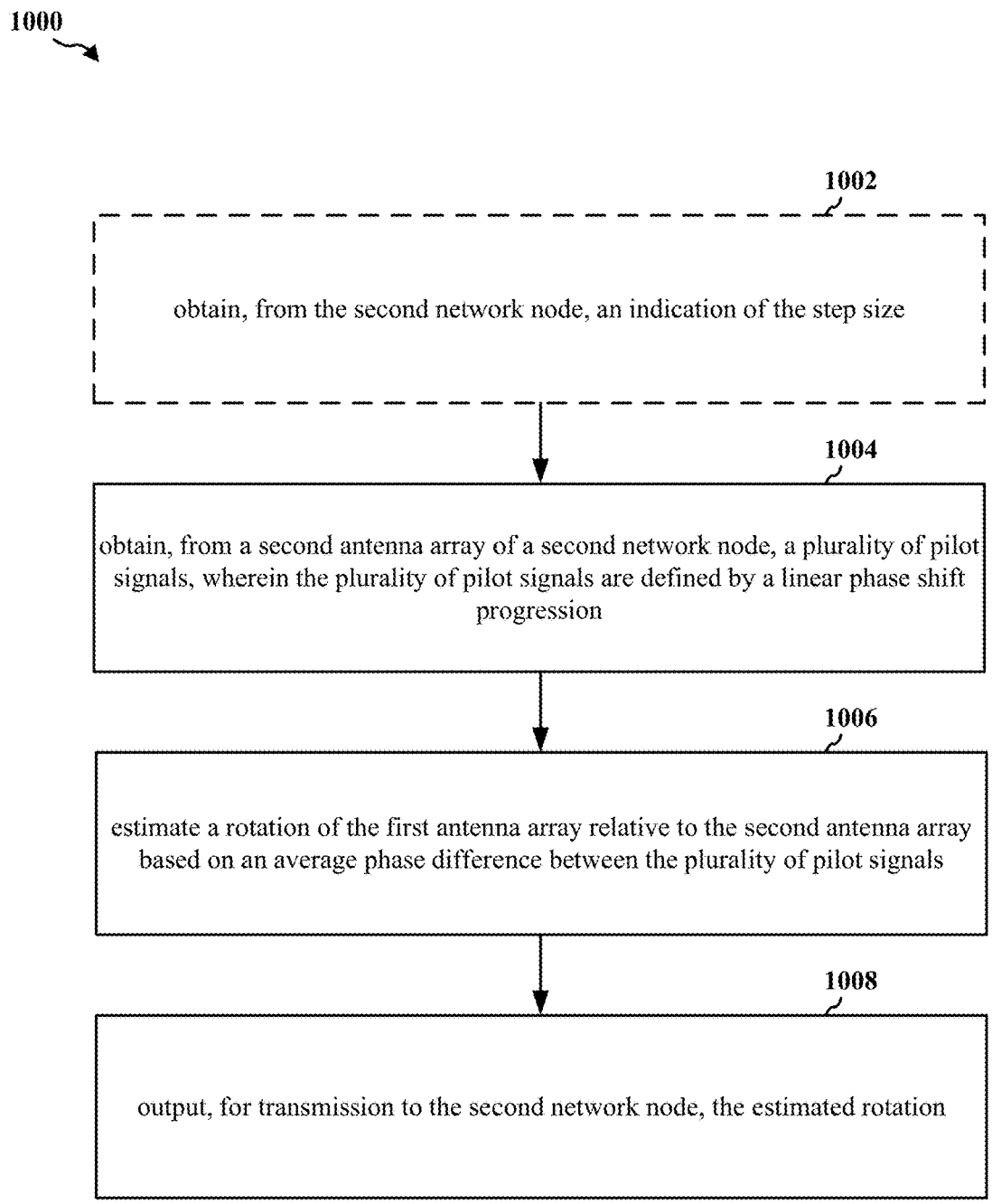
FIG. 10 is a flowchart of a method of wireless communication.

FIG. 10 is a flowchart 1000 of a method of wireless communication. The method may be performed by a first network node (e.g., the UE 104 or base station 102 of FIG. 1; the apparatus 1102). At 1002, the first network node may optionally obtain, from a second network node, an indication of a step size. In certain aspects, the indication of the step size is received via radio resource control (RRC) messaging.

At 1004, the first network node may obtain, from a second antenna array of the second network node, a plurality of pilot signals, wherein the plurality of pilot signals are defined by a linear phase shift progression.

At 1006, the first network node may estimate a rotation of the first antenna array relative to the second antenna array based on an average phase difference between the plurality of pilot signals.

At 1008, the first network node may output, for transmission to the second network node, the estimated rotation.

In certain aspects, a first group of the plurality of pilot signals are defined by the first phase shift, a second group of the plurality of pilot signal are defined by the second phase shift, a third group and a fourth group of the plurality of pilot signals reflect the linear phase shift progression defined by a step size, and a difference between the first phase shift and the second phase shift is defined by the step size.

In certain aspects, the estimated rotation is a function of the step size.

In certain aspects, the average phase difference comprises: a first average phase difference between the first group and the second group, and a second average phase difference between the third group and the fourth group.

In certain aspects, the step size is a function of a number of pilot signals in the first group or the second group.

In certain aspects, the step size is defined in terms of radians.

In certain aspects, the estimated rotation is a trigonometric function of the average phase difference.

In certain aspects, the plurality of pilot signals are obtained via a line-of-sight (LOS) multiple-input multiple output (MIMO) wireless link between the first network node and the second network node.

In certain aspects, the rotation of the first antenna array relative to the second antenna array is a rotation about an axis perpendicular to a surface of the first antenna array.

Figure 11:
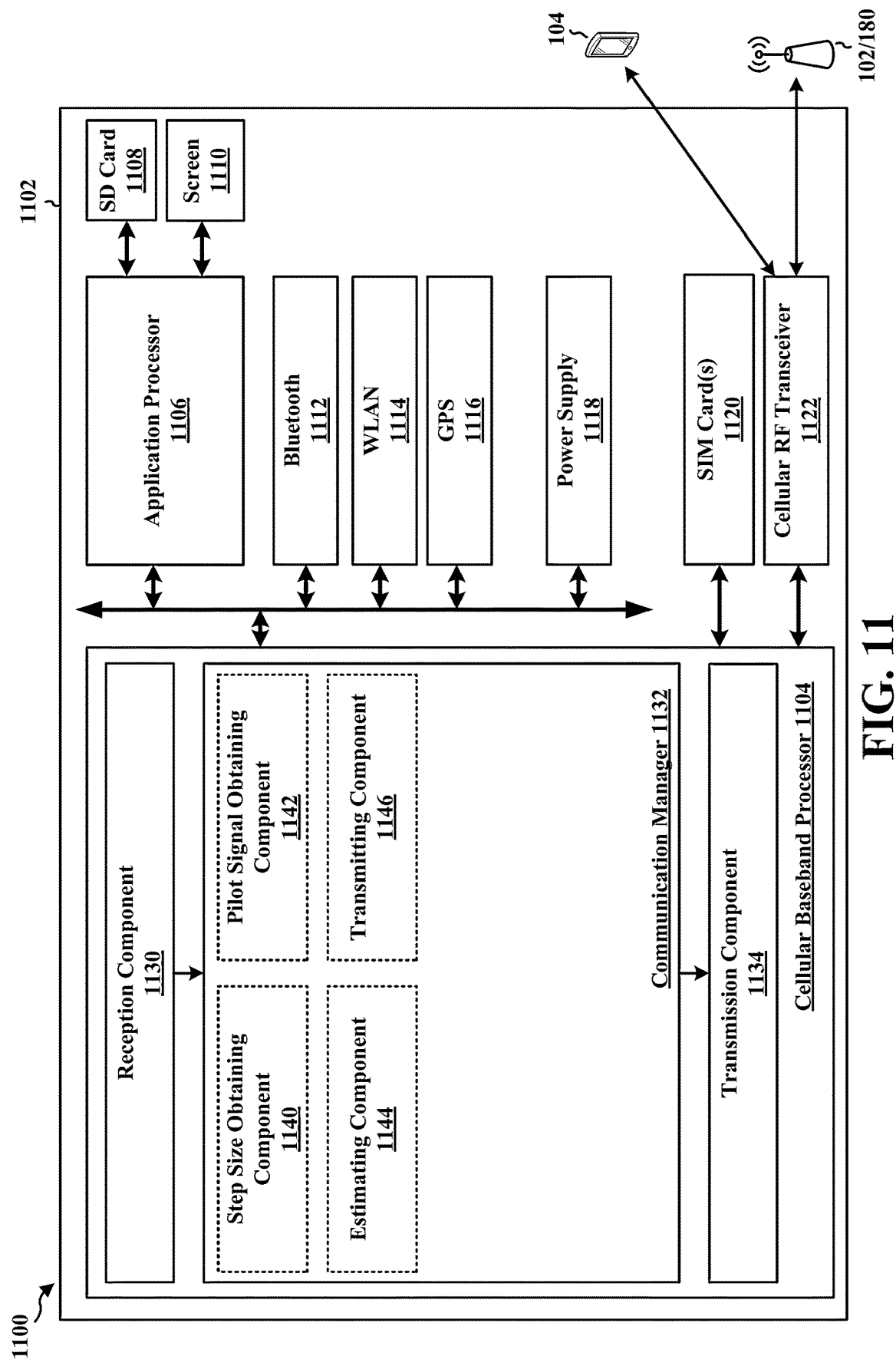
FIG. 11 is a diagram illustrating an example of a hardware implementation for an example apparatus.

FIG. 11 is a diagram 1100 illustrating an example of a hardware implementation for an apparatus 1102. The apparatus 1102 may be configured as a base station or a UE, and includes a cellular baseband processor 1104 (also referred to as a modem) coupled to a cellular RF transceiver 1122 and one or more subscriber identity modules (SIM) cards 1120, an application processor 1106 coupled to a secure digital (SD) card 1108 and a screen 1110, a Bluetooth module 1112, a wireless local area network (WLAN) module 1114, a Global Positioning System (GPS) module 1116, and a power supply 1118. The cellular baseband processor 1104 communicates through the cellular RF transceiver 1122 with the UE 104 and/or BS 102/180. The cellular baseband processor 1104 may include a computer-readable medium/memory. The computer-readable medium/memory may be non-transitory. The cellular baseband processor 1104 is responsible for general processing, including the execution of software stored on the computer-readable medium/memory. The software, when executed by the cellular baseband processor 1104, causes the cellular baseband processor 1104 to perform the various functions described supra. The computer-readable medium/memory may also be used for storing data that is manipulated by the cellular baseband processor 1104 when executing software. The cellular baseband processor 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the cellular baseband processor 1104. The cellular baseband processor 1104 may be a component of the UE 350 and may include the memory 360 and/or at least one of the TX processor 368, the RX processor 356, and the controller/processor 359. In one configuration, the apparatus 1102 may be a modem chip and include just the baseband processor 1104, and in another configuration, the apparatus 1102 may be the entire UE (e.g., see 350 of FIG. 3) and include the aforediscussed additional modules of the apparatus 1102.

The communication manager 1132 includes a step size obtaining component 1140 that is configured to obtain, from the second network node, an indication of the step size, e.g., as described in connection with 1002 of FIG. 10.

The communication manager 1132 further includes a pilot signal obtaining component 1142 that receives input in the form of a pilot signal with a phase shift and is configured to obtain, from a second antenna array of a second network node, a plurality of pilot signals, wherein the plurality of pilot signals are defined by a linear phase shift progression, e.g., as described in connection with 1004 of FIG. 10.

The communication manager 1132 further includes an estimating component 1144 configured to estimate a rotation of the first antenna array relative to the second antenna array based on an average phase difference between the plurality of pilot signals, e.g., as described in connection with 1006 of FIG. 10.

The communication manager 1132 further includes a transmitting component 1146 configured to output, for transmission to the second network node, the estimated rotation, e.g., as described in connection with 1008 of FIG. 10.

The apparatus may include additional components that perform each of the blocks of the algorithm in the aforementioned flowchart of FIG. 10. As such, each block in the aforementioned flowchart may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1102, and in particular the cellular baseband processor 1104, includes means for obtaining, from the second network node, an indication of the step size; means for obtaining, from a second antenna array of a second network node, a plurality of pilot signals, wherein the plurality of pilot signals are defined by a linear phase shift progression; means for estimating a rotation of the first antenna array relative to the second antenna array based on an average phase difference between the plurality of pilot signals; and means for output, for transmission to the second network node, the estimated rotation.

The aforementioned means may be one or more of the aforementioned components of the apparatus 1102 configured to perform the functions recited by the aforementioned means. As described supra, the apparatus 1102 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 12:
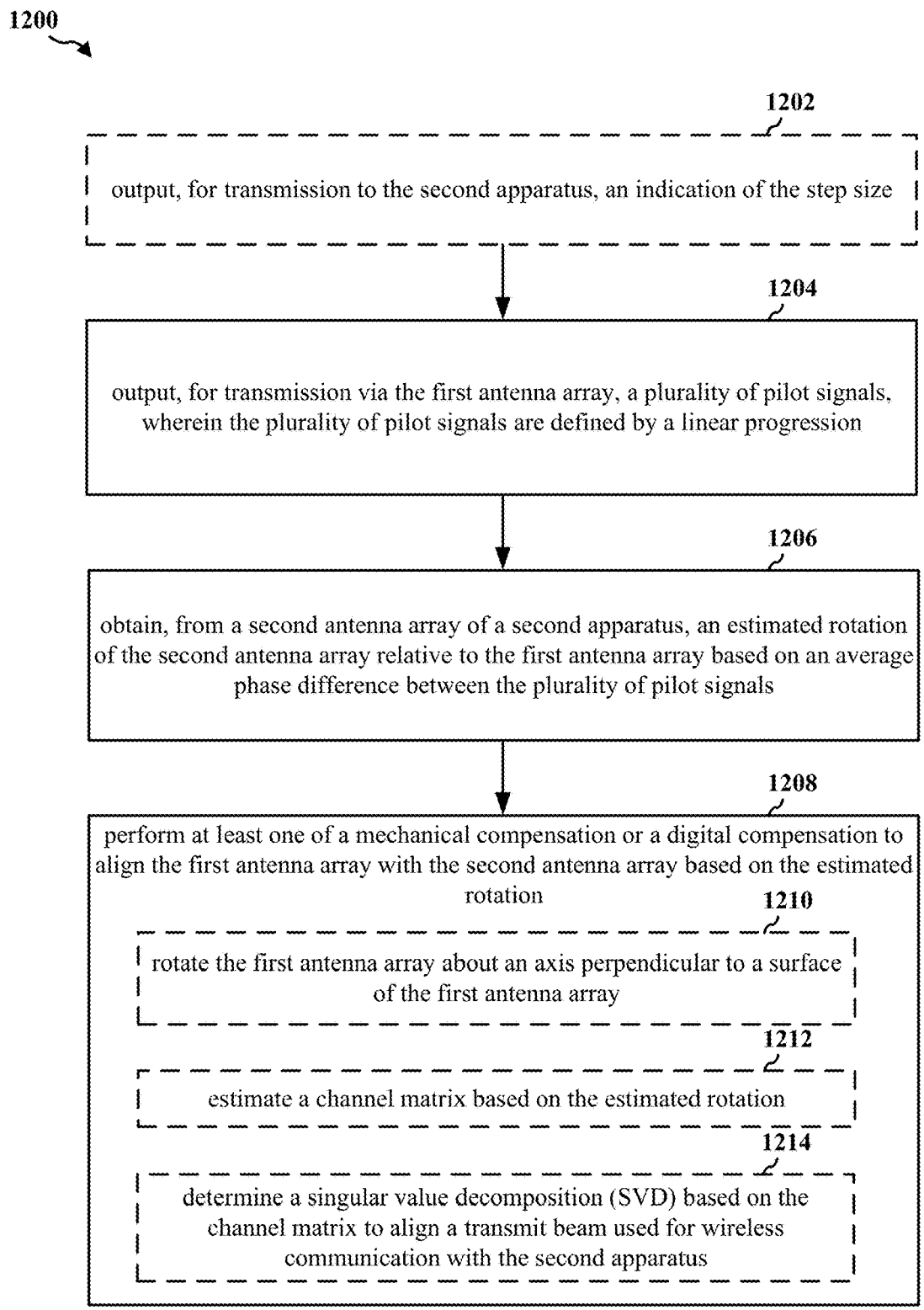
FIG. 12 is a flowchart of a method of wireless communication.

FIG. 12 is a flowchart 1200 of a method of wireless communication. The method may be performed by a first network node (e.g., the UE 104 or base station 102 of FIG. 1; the apparatus 1302). At 1202, the first network node may optionally output, for transmission to the second apparatus, an indication of the step size. In certain aspects, the indication of the step size is output for transmission via radio resource control (RRC) messaging.

At 1204, the first network node may output, for transmission via the first antenna array, a plurality of pilot signals, wherein the plurality of pilot signals are defined by a linear progression.

At 1206, the first network node may obtain, from a second antenna array of a second apparatus, an estimated rotation of the second antenna array relative to the first antenna array based on an average phase difference between the plurality of pilot signals.

At 1208, the first network node may perform at least one of a mechanical compensation or a digital compensation to align the first antenna array with the second antenna array based on the estimated rotation.

At 1210, the first network node may rotate the first antenna array about an axis perpendicular to a surface of the first antenna array.

At 1212, the first network node may estimate a channel matrix based on the estimated rotation.

At 1214, the first network node may determine a singular value decomposition (SVD) based on the channel matrix to align a transmit beam used for wireless communication with the second apparatus.

In certain aspects, the first antenna array comprises a plurality of antenna elements, and wherein the plurality of pilot signals are output for transmission from a subset of the plurality of antenna elements.

In certain aspects, a first group of the plurality of pilot signals are defined by the first phase shift, a second group of the plurality of pilot signal are defined by the second phase shift, a third group and a fourth group of the plurality of pilot signals reflect the linear phase shift progression defined by a step size, and a difference between the first phase shift and the second phase shift is defined by the step size.

In certain aspects, the estimated rotation is a function of the step size.

In certain aspects, the step size is a function of a number of pilot signals in the first group or the second group.

In certain aspects, the step size is defined in terms of radians.

In certain aspects, the plurality of pilot signals are output for transmission via a line-of-sight (LOS) multiple-input multiple output (MIMO) wireless link between the first apparatus and the second apparatus.

Figure 13:
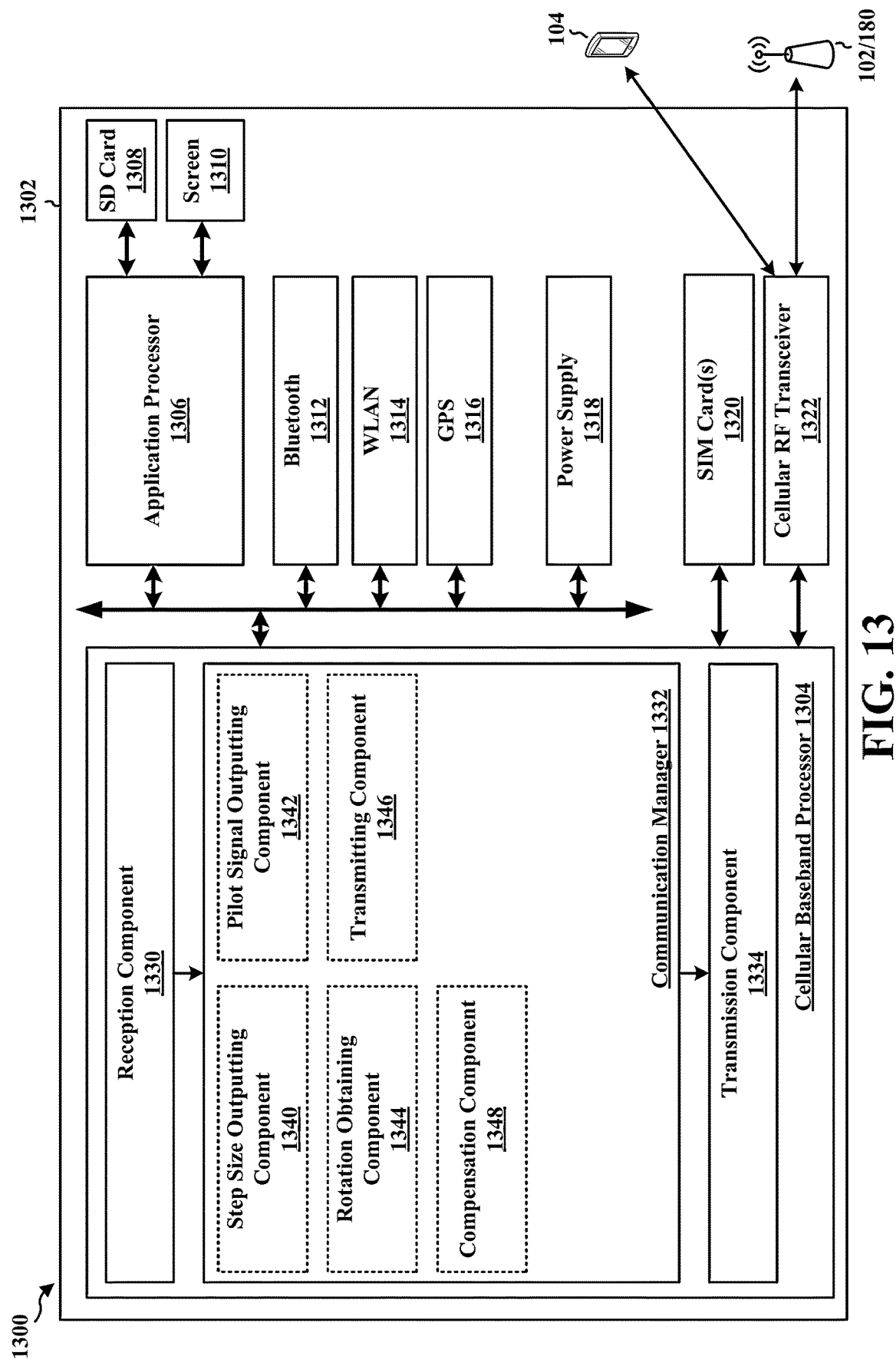
FIG. 13 is a diagram illustrating another example of a hardware implementation for another example apparatus.

FIG. 13 is a diagram 1300 illustrating an example of a hardware implementation for an apparatus 1302. The apparatus 1302 may be configured as a base station or a UE, and includes a cellular baseband processor 1304 (also referred to as a modem) coupled to a cellular RF transceiver 1322 and one or more subscriber identity modules (SIM) cards 1320, an application processor 1306 coupled to a secure digital (SD) card 1308 and a screen 1310, a Bluetooth module 1312, a wireless local area network (WLAN) module 1314, a Global Positioning System (GPS) module 1316, and a power supply 1318. The cellular baseband processor 1304 communicates through the cellular RF transceiver 1322 with the UE 104 and/or BS 102/180. The cellular baseband processor 1304 may include a computer-readable medium/memory. The computer-readable medium/memory may be non-transitory. The cellular baseband processor 1304 is responsible for general processing, including the execution of software stored on the computer-readable medium/memory. The software, when executed by the cellular baseband processor 1304, causes the cellular baseband processor 1304 to perform the various functions described supra. The computer-readable medium/memory may also be used for storing data that is manipulated by the cellular baseband processor 1304 when executing software. The cellular baseband processor 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the cellular baseband processor 1304. The cellular baseband processor 1304 may be a component of the UE 350 and may include the memory 360 and/or at least one of the TX processor 368, the RX processor 356, and the controller/processor 359. In one configuration, the apparatus 1302 may be a modem chip and include just the baseband processor 1304, and in another configuration, the apparatus 1302 may be the entire UE (e.g., see 350 of FIG. 3) and include the aforediscussed additional modules of the apparatus 1302.

The communication manager 1332 includes a step size outputting component 1340 configured to output, for transmission to the second apparatus, an indication of the step size, e.g., as described in connection with 1202 of FIG. 12.

The communication manager 1332 further includes a pilot signal outputting component 1342 configured to output, for transmission via the first antenna array, a plurality of pilot signals, wherein the plurality of pilot signals are defined by a linear progression, e.g., as described in connection with 1204 of FIG. 12.

The communication manager 1332 further includes a rotation obtaining component 1344 configured to obtain, from a second antenna array of a second apparatus, an estimated rotation of the second antenna array relative to the first antenna array based on an average phase difference between the plurality of pilot signals, e.g., as described in connection with 1206 of FIG. 12.

The communication manager 1332 further includes a rotation obtaining component 1348 configured to perform at least one of a mechanical compensation or a digital compensation to align the first antenna array with the second antenna array based on the estimated rotation; rotate the first antenna array about an axis perpendicular to a surface of the first antenna array; estimate a channel matrix based on the estimated rotation; determine a singular value decomposition (SVD) based on the channel matrix to align a transmit beam used for wireless communication with the second apparatus, e.g., as described in connection with 1208-1214 of FIG. 12.

The apparatus may include additional components that perform each of the blocks of the algorithm in the aforementioned flowchart of FIG. 12. As such, each block in the aforementioned flowchart of FIG. 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1302, and in particular the baseband unit 1304, includes means for outputting, for transmission to the second apparatus, an indication of the step size; means for outputting, for transmission via the first antenna array, a plurality of pilot signals, wherein the plurality of pilot signals are defined by a linear progression; means for obtaining, from a second antenna array of a second apparatus, an estimated rotation of the second antenna array relative to the first antenna array based on an average phase difference between the plurality of pilot signals; means for performing at least one of a mechanical compensation or a digital compensation to align the first antenna array with the second antenna array based on the estimated rotation; means for rotating the first antenna array about an axis perpendicular to a surface of the first antenna array; means for estimating a channel matrix based on the estimated rotation; and means for determine a singular value decomposition (SVD) based on the channel matrix to align a transmit beam used for wireless communication with the second apparatus.

The aforementioned means may be one or more of the aforementioned components of the apparatus 1302 configured to perform the functions recited by the aforementioned means. As described supra, the apparatus 1302 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

Additional Considerations

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

Example Aspects

The following examples are illustrative only and may be combined with aspects of other embodiments or teachings described herein, without limitation.

Example 1 is a method for wireless communication at an apparatus, comprising: obtaining, from a first antenna array of a wireless node, a plurality of pilot signals, wherein the plurality of pilot signals are defined by a linear phase shift progression; estimating a rotation of a second antenna array relative to the first antenna array based on an average phase difference between the plurality of pilot signals; and outputting, for transmission to the wireless node, the estimated rotation.

Example 2 is the method of example 1 wherein: a first group of the plurality of pilot signals are defined by a first phase shift, a second group of the plurality of pilot signals are defined by a second phase shift, a third group and a fourth group of the plurality of pilot signals reflect the linear phase shift progression defined by a step size, and a difference between the first phase shift and the second phase shift is defined by the step size.

Example 3 is the method of example 2, wherein the estimated rotation is a function of the step size.

Example 4 is the method of any of examples 2 and 3, further comprising: computing the average phase difference based on: a first average phase difference between the first group and the second group, and a second average phase difference between the third group and the fourth group.

Example 5 is the method of any of examples 2-4 wherein the step size is a function of a number of pilot signals in the first group or the second group.

Example 6 is the method of any of examples 2-5 further comprising: obtaining, from the wireless node, an indication of the step size.

Example 7 is the method of any of examples 2-6 wherein the indication of the step size is obtained via radio resource control (RRC) messaging.

Example 8 is the method of any of examples 2-7 wherein the step size is defined in terms of radians.

Example 9 is the method of any of examples 1-8 wherein the estimated rotation is a trigonometric function of the average phase difference.

Example 10 is the method of any of examples 1-9 wherein the plurality of pilot signals are obtained via a line-of-sight (LOS) multiple-input multiple output (MIMO) wireless link between the apparatus and the wireless node.

Example 11 is the method of any of examples 1-10 wherein the rotation of the second antenna array relative to the first antenna array is a rotation about an axis perpendicular to a surface of the second antenna array.

Example 12 is a method for wireless communication at an apparatus, comprising: outputting, for transmission via a first antenna array, a plurality of pilot signals, wherein the plurality of pilot signals are defined by a linear phase shift progression; obtaining, from a second antenna array of a wireless node, an estimated rotation of the second antenna array relative to the first antenna array based on an average phase difference between the plurality of pilot signals; and aligning the first antenna array with the second antenna array based on the estimated rotation.

Example 13 is the method of example 12 wherein aligning the first antenna array with the second antenna array further comprises: rotating the first antenna array about an axis perpendicular to a surface of the first antenna array.

Example 14 is the method of any of examples 12 and 13 wherein aligning the first antenna array with the second antenna array further comprises: estimating a channel matrix based on the estimated rotation; and determining a singular value decomposition (SVD) based on the channel matrix to align a transmit beam used for wireless communication with the wireless node.

Example 15 is the method of any of examples 12-14 wherein the first antenna array comprises a plurality of antenna elements, and wherein the plurality of pilot signals are output for transmission from a subset of the plurality of antenna elements.

Example 16 is the method of any of examples 12-15 further comprising: outputting a radio resource control (RRC) message for transmission, wherein the RRC message comprises an indication of the subset of the plurality of antenna elements.

Example 17 is the method of any of examples 12-16 wherein the RRC message further comprises an indication of whether the subset of the plurality of antenna elements are located in at least one of a center of the first antenna array or in a corner of the first antenna array.

Example 18 is the method of any of examples 12-17 wherein: a first group of the plurality of pilot signals are defined by a first phase shift, a second group of the plurality of pilot signals are defined by a second phase shift, a third group and a fourth group of the plurality of pilot signals reflect the linear phase shift progression defined by a step size, and a difference between the first phase shift and the second phase shift is defined by the step size.

Example 19 is the method of any of examples 12-18 wherein the estimated rotation is a function of the step size.

Example 20 is the method of any of examples 12-19 wherein the step size is a function of a number of pilot signals in the first group or the second group.

Example 21 is the method of any of examples 12-20 further comprising: outputting, for transmission to the wireless node, an indication of the step size.

Example 22 is the method of any of examples 12-21 wherein the indication of the step size is output for transmission via radio resource control (RRC) messaging.

Example 23 is the method of any of examples 12-22 wherein the step size is defined in terms of radians.

Example 24 is the method of any of examples 12-23 wherein the plurality of pilot signals are output for transmission via a line-of-sight (LOS) multiple-input multiple output (MIMO) wireless link between the apparatus and the wireless node.

Example 25 is a first wireless node, comprising: a transceiver; a memory comprising instructions; and one or more processors configured to execute the instructions to cause the first wireless node to perform a method in accordance with any one of examples 1-11, wherein the transceiver is configured to: receive, from a first antenna array of a second wireless node, a plurality of pilot signals, wherein the plurality of pilot signals are defined by a linear phase shift progression; and transmit, to the wireless node, the estimated rotation.

Example 26 is the first wireless node of example 25, wherein the first wireless node is one of a base station or a user equipment.

Example 27 is a first wireless node, comprising: a transceiver; a memory comprising instructions; and one or more processors configured to execute the instructions and cause the first wireless node to perform a method in accordance with any one of examples 12-24, wherein the transceiver is configured to: transmit, via a first antenna array, a plurality of pilot signals, wherein the plurality of pilot signals are defined by a linear phase shift progression; and receive, from a second antenna array of a second wireless node, an estimated rotation of the second antenna array relative to the first antenna array based on an average phase difference between the plurality of pilot signals.

Example 28 is the first wireless node of example 27, wherein the first wireless node is one of a base station or a user equipment.

Example 29 is an apparatus for wireless communications, comprising means for performing a method in accordance with any one of examples 1-11.

Example 30 is an apparatus for wireless communications, comprising means for performing a method in accordance with any one of examples 12-24.

Example 31 is a non-transitory computer-readable medium comprising instructions that, when executed by an apparatus, causes the apparatus to perform a method in accordance with any one of examples 1-11.

Example 32 is a non-transitory computer-readable medium comprising instructions that, when executed by an apparatus, cause the apparatus to perform a method in accordance with any one of examples 12-24.

Example 33 is an apparatus for wireless communications, comprising: a memory comprising instructions; and one or more processors configured to execute the instructions to cause the apparatus to perform a method in accordance with any one of examples 1-11.

Example 33 is apparatus for wireless communications, comprising: a memory comprising instructions; and one or more processors configured to execute the instructions to cause the apparatus to perform a method in accordance with any one of examples 12-24.

What is claimed is:

1. A apparatus configured for wireless communication, comprising:
   a memory comprising instructions; and
   one or more processors configured to execute the instructions and cause the apparatus to:
   obtain, from a first antenna array of a wireless node, a plurality of pilot signals, wherein the plurality of pilot signals are defined by a linear phase shift progression;

estimate a rotation of a second antenna array relative to the first antenna array based on an average phase difference between the plurality of pilot signals; and output, for transmission to the wireless node, the estimated rotation.

2. The apparatus of claim 1, wherein:
a first group of the plurality of pilot signals are defined by a first phase shift,
a second group of the plurality of pilot signals are defined by a second phase shift,
a third group and a fourth group of the plurality of pilot signals reflect the linear phase shift progression defined by a step size, and
a difference between the first phase shift and the second phase shift is defined by the step size.

3. The apparatus of claim 2, wherein the estimated rotation is a function of the step size.

4. The apparatus of claim 2, wherein the apparatus is further configured to compute the average phase difference based on:
a first average phase difference between the first group and the second group, and
a second average phase difference between the third group and the fourth group.

5. The apparatus of claim 2, wherein the step size is a function of a number of pilot signals in the first group or the second group.

6. The apparatus of claim 2, wherein the one or more processors are further configured to:
obtain, from the wireless node, an indication of the step size.

7. The apparatus of claim 6, wherein the indication of the step size is obtained via radio resource control (RRC) messaging.

8. The apparatus of claim 2, wherein the step size is defined in terms of radians.

9. The apparatus of claim 1, wherein the estimated rotation is a trigonometric function of the average phase difference.

10. The apparatus of claim 1, wherein the plurality of pilot signals are obtained via a line-of-sight (LOS) multiple-input multiple output (MIMO) wireless link between the apparatus and the wireless node.

11. The apparatus of claim 1, wherein the rotation of the second antenna array relative to the first antenna array is a rotation about an axis perpendicular to a surface of the second antenna array.

12. The apparatus of claim 1, further comprising a transceiver configured to:
receive the plurality of pilot signals; and
transmit the estimated rotation, wherein the apparatus is configured as a user equipment (UE) or a base station.

13. A apparatus configured for wireless communication, comprising:
a memory comprising instructions; and
one or more processors configured to execute the instructions and cause the apparatus to:
output, for transmission via a first antenna array, a plurality of pilot signals, wherein the plurality of pilot signals are defined by a linear phase shift progression;
obtain, from a second antenna array of a wireless node, an estimated rotation of the second antenna array relative to the first antenna array based on an average phase difference between the plurality of pilot signals; and align the first antenna array with the second antenna array based on the estimated rotation.

14. The apparatus of claim 13, wherein the one or more processors, being configured to align the first antenna array with the second antenna array, are further configured to:
rotate the first antenna array about an axis perpendicular to a surface of the first antenna array.

15. The apparatus of claim 13, wherein the one or more processors, being configured to align the first antenna array with the second antenna array, are further configured to:
estimate a channel matrix based on the estimated rotation; and
determine a singular value decomposition (SVD) based on the channel matrix to align a transmit beam used for wireless communication with the wireless node.

16. The apparatus of claim 13, wherein the first antenna array comprises a plurality of antenna elements, and wherein the plurality of pilot signals are output for transmission from a subset of the plurality of antenna elements.

17. The apparatus of claim 16, wherein the one or more processors are further configured to:
output a radio resource control (RRC) message for transmission, wherein the RRC message comprises an indication of the subset of the plurality of antenna elements.

18. The apparatus of claim 17, wherein the RRC message further comprises an indication of whether the subset of the plurality of antenna elements are located in at least one of a center of the first antenna array or in a corner of the first antenna array.

19. The apparatus of claim 13, wherein:
a first group of the plurality of pilot signals are defined by a first phase shift,
a second group of the plurality of pilot signals are defined by a second phase shift,
a third group and a fourth group of the plurality of pilot signals reflect the linear phase shift progression defined by a step size, and
a difference between the first phase shift and the second phase shift is defined by the step size.

20. The apparatus of claim 19, wherein the estimated rotation is a function of the step size.

21. The apparatus of claim 19, wherein the step size is a function of a number of pilot signals in the first group or the second group.

22. The apparatus of claim 19, wherein the one or more processors are further configured to:
output, for transmission to the wireless node, an indication of the step size.

23. The apparatus of claim 22, wherein the indication of the step size is output for transmission via radio resource control (RRC) messaging.

24. The apparatus of claim 19, wherein the step size is defined in terms of radians.

25. The apparatus of claim 13, wherein the plurality of pilot signals are output for transmission via a line-of-sight (LOS) multiple-input multiple output (MIMO) wireless link between the apparatus and the wireless node.

26. The apparatus of claim 13, further comprising a transceiver configured to:
transmit the plurality of pilot signals; and
receive the estimated rotation of the second antenna array relative to the first antenna array, wherein the apparatus is configured as a user equipment (UE) or a base station.

27. A method for wireless communication at a first wireless node, comprising:
- obtaining, from a first antenna array of a second wireless node, a plurality of pilot signals, wherein the plurality of pilot signals are defined by a linear phase shift progression;
- estimating a rotation of a second antenna array relative to the first antenna array based on an average phase difference between the plurality of pilot signals; and
- outputting, for transmission to the second wireless node, the estimated rotation.

28. The method of claim 27, wherein:
- a first group of the plurality of pilot signals are defined by a first phase shift,
- a second group of the plurality of pilot signals are defined by a second phase shift,
- a third group and a fourth group of the plurality of pilot signals reflect the linear phase shift progression defined by a step size, and
- a difference between the first phase shift and the second phase shift is defined by the step size.

29. The method of claim 28, wherein the estimated rotation is a function of the step size.

30. The method of claim 28, further comprising outputting, for transmission to the second wireless node, an indication of the step size.

* * * * *